US012666369B2

(12) United States Patent
Choi et al.

(10) Patent No.: US 12,666,369 B2
(45) Date of Patent: Jun. 23, 2026

(54) SRS POWER CONTROL METHODS FOR CHANNEL ESTIMATION OF RECONFIGURABLE INTELLIGENT SURFACE LINK

(71) Applicant: QUALCOMM Incorporated, San Diego, CA (US)

(72) Inventors: Jinseok Choi, Austin, TX (US); Yu Zhang, San Diego, CA (US); Saeid Sahraei, San Diego, CA (US); Krishna Kiran Mukkavilli, San Diego, CA (US); Hwan Joon Kwon, San Diego, CA (US); Tingfang Ji, San Diego, CA (US); Naga Bhushan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 402 days.

(21) Appl. No.: 18/042,260

(22) PCT Filed: Oct. 12, 2020

(86) PCT No.: PCT/CN2020/120380
§ 371 (c)(1),
(2) Date: Feb. 20, 2023

(87) PCT Pub. No.: WO2022/077162
PCT Pub. Date: Apr. 21, 2022

(65) Prior Publication Data
US 2023/0328660 A1    Oct. 12, 2023

(51) Int. Cl.
H04W 52/24 (2009.01)
H04W 52/08 (2009.01)
(Continued)

(52) U.S. Cl.
CPC ......... H04W 52/325 (2013.01); H04W 52/08 (2013.01); H04W 52/10 (2013.01); H04W 52/365 (2013.01)

(58) Field of Classification Search
CPC .. H04L 25/0224; H04W 52/08; H04W 52/10; H04W 52/146; H04W 52/242; H04W 52/325; H04W 52/365
See application file for complete search history.

(56) References Cited

U.S. PATENT DOCUMENTS 6,006,110 A * 12/1999 Raleigh ................. H01Q 25/00
375/232
6,212,406 B1 * 4/2001 Keskitalo ................ H04B 7/10
455/562.1
(Continued)

FOREIGN PATENT DOCUMENTS

AU      2018400270 A1 * 8/2020 ......... H04L 25/0226
AU      2020202343 B2 * 5/2021 .......... H04B 7/0404
(Continued)

OTHER PUBLICATIONS

Supplementary European Search Report—EP20956944—Search Authority—The Hague—Jun. 10, 2024.
(Continued)

*Primary Examiner* — Phuc H Tran
(74) *Attorney, Agent, or Firm* — Holland & Hart LLP

(57) ABSTRACT

Methods, systems, and devices for wireless communications are described. A base station may determine a sounding reference signal transmission power of a user equipment (UE) and may communicate with the UE according to the determined sounding reference signal transmission power. In some examples, the base station may transmit signaling to the UE indicating a switch from a first power control mode to a second power control mode. The UE may transmit, to the base station and in the second power control mode, a
(Continued)

power headroom report which the base station may use to estimate the sounding reference signal transmission power. In other examples, the base station may transmit a request for one or more reports that indicate the sounding reference signal transmission power based on the base station operating in a closed-loop power control mode. The UE may transmit the one or more reports to the base station.

31 Claims, 18 Drawing Sheets

(51) Int. Cl.
  *H04W 52/10*      (2009.01)
  *H04W 52/32*      (2009.01)
  *H04W 52/36*      (2009.01)

(56)          References Cited

U.S. PATENT DOCUMENTS

| | | | | |
|---|---|---|---|---|
| 11,848,709 | B2 * | 12/2023 | Medra | H04B 7/04013 |
| 2010/0040036 | A1 | 2/2010 | Ofuji et al. | |
| 2013/0310077 | A1 * | 11/2013 | Siomina | H04W 4/02 |
| | | | | 455/456.2 |
| 2014/0080488 | A1 * | 3/2014 | Michel | H04W 24/10 |
| | | | | 455/436 |
| 2015/0358920 | A1 * | 12/2015 | Sorrentino | H04W 52/228 |
| | | | | 455/522 |
| 2019/0098586 | A1 | 3/2019 | Akkarakaran et al. | |
| 2019/0364511 | A1 * | 11/2019 | Chen | H04W 52/242 |
| 2020/0028638 | A1 | 1/2020 | Liu et al. | |
| 2020/0205085 | A1 * | 6/2020 | Li | H04W 52/325 |
| 2022/0014935 | A1 * | 1/2022 | Haija | H04L 5/0048 |
| 2024/0129870 | A1 * | 4/2024 | Kim | H04J 13/0062 |

FOREIGN PATENT DOCUMENTS

| | | |
|---|---|---|
| CN | 104518845 A | 4/2015 |
| CN | 106912094 A | 6/2017 |
| CN | 109600826 A | 4/2019 |
| CN | 109803367 A | 5/2019 |
| WO | 2014148181 A1 | 9/2014 |
| WO | WO-2020076843 | 4/2020 |

OTHER PUBLICATIONS

International Search Report and Written Opinion—PCT/CN2020/ 120380—ISA/EPO—Jul. 12, 2021.

Zhao., et al., "Power Spectral Density Estimation from Random Interleaved Samples", 2017 IEEE 13th International Conference on Electronic Measurement & Instruments, Dec. 31, 2017 (Dec. 31, 2017) the whole document, 4 Pages.

* cited by examiner

610

615

620

605

600

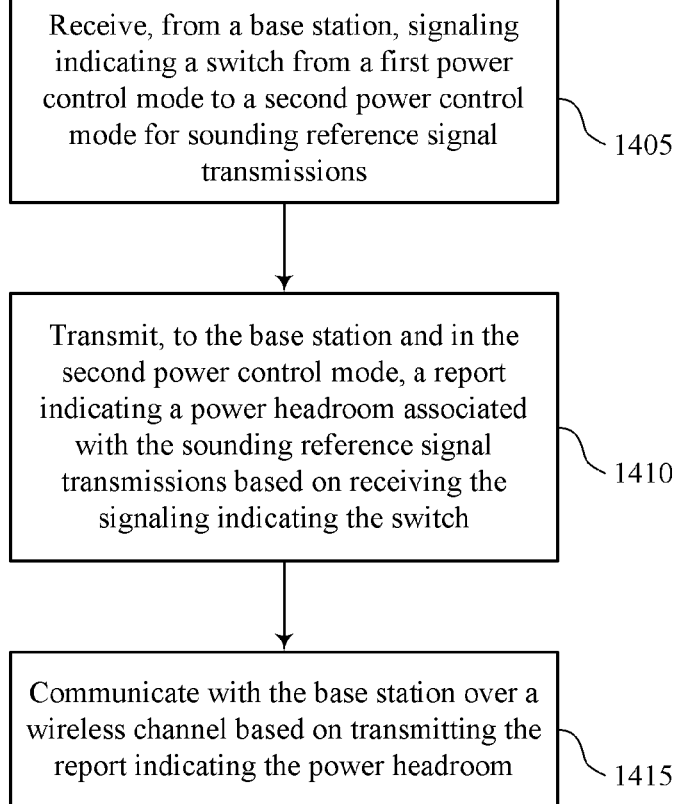

Receive, from a base station, signaling indicating a switch from a first power control mode to a second power control mode for sounding reference signal transmissions

1405

Transmit, to the base station and in the second power control mode, a report indicating a power headroom associated with the sounding reference signal transmissions based on receiving the signaling indicating the switch

1410

Communicate with the base station over a wireless channel based on transmitting the report indicating the power headroom

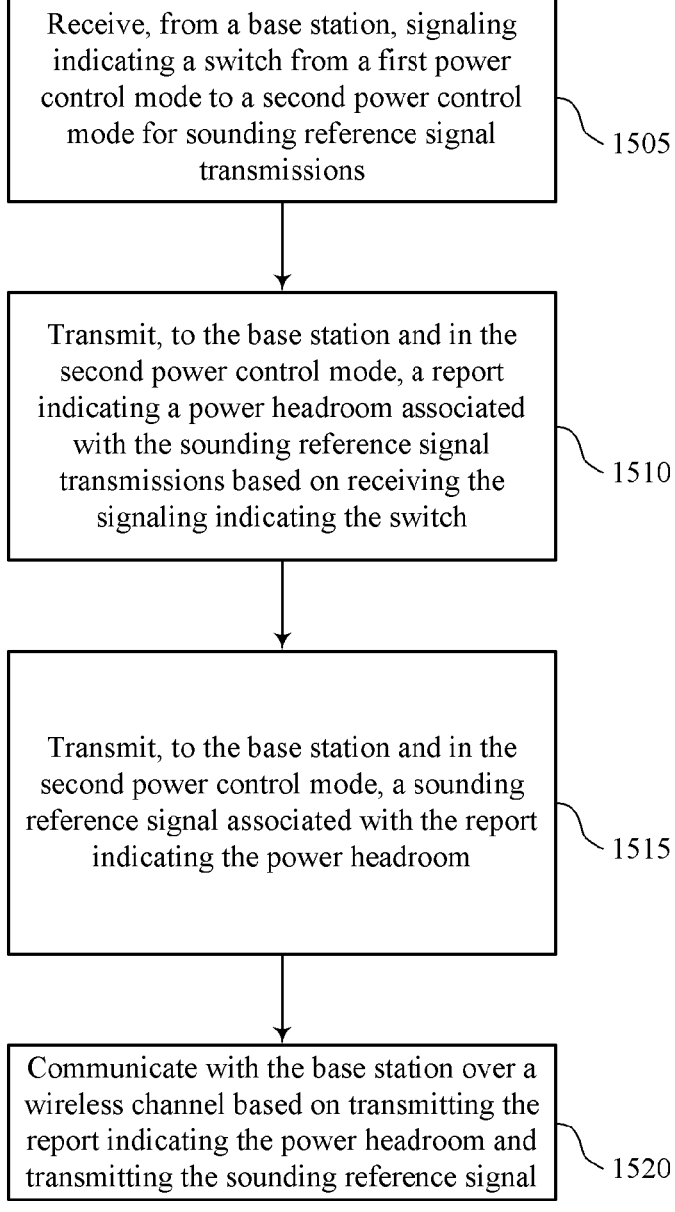

Receive, from a base station, signaling indicating a switch from a first power control mode to a second power control mode for sounding reference signal transmissions

1505

Transmit, to the base station and in the second power control mode, a report indicating a power headroom associated with the sounding reference signal transmissions based on receiving the signaling indicating the switch

1510

Transmit, to the base station and in the second power control mode, a sounding reference signal associated with the report indicating the power headroom

1515

Communicate with the base station over a wireless channel based on transmitting the report indicating the power headroom and transmitting the sounding reference signal

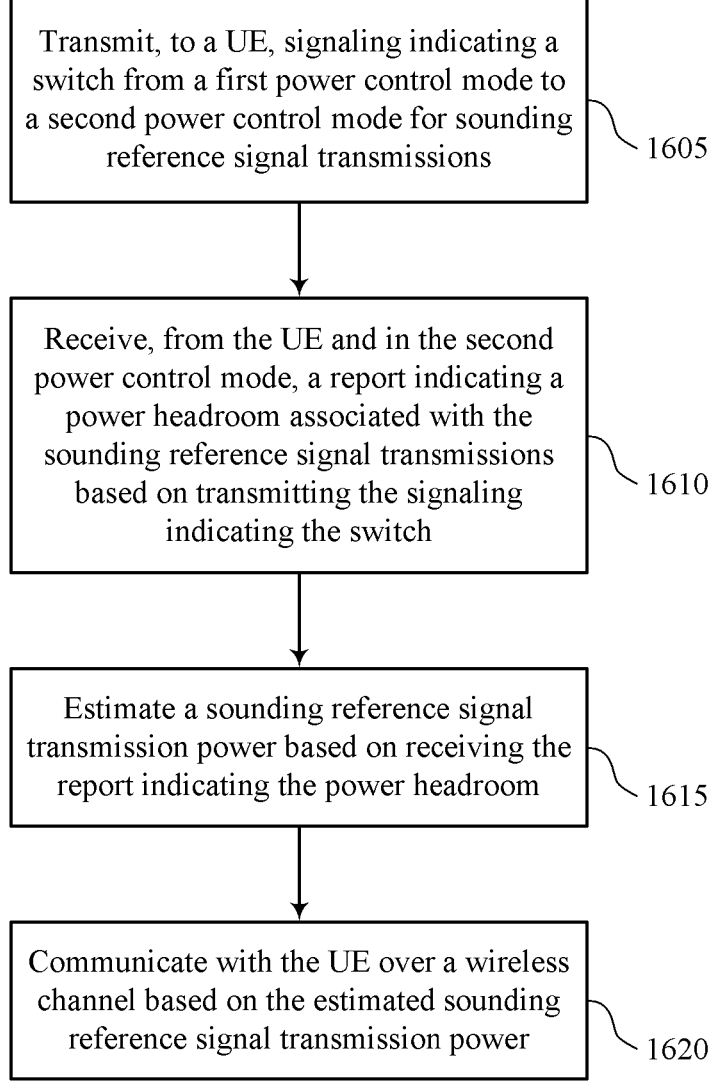

Transmit, to a UE, signaling indicating a switch from a first power control mode to a second power control mode for sounding reference signal transmissions

1605

Receive, from the UE and in the second power control mode, a report indicating a power headroom associated with the sounding reference signal transmissions based on transmitting the signaling indicating the switch

1610

Estimate a sounding reference signal transmission power based on receiving the report indicating the power headroom

1615

Communicate with the UE over a wireless channel based on the estimated sounding reference signal transmission power

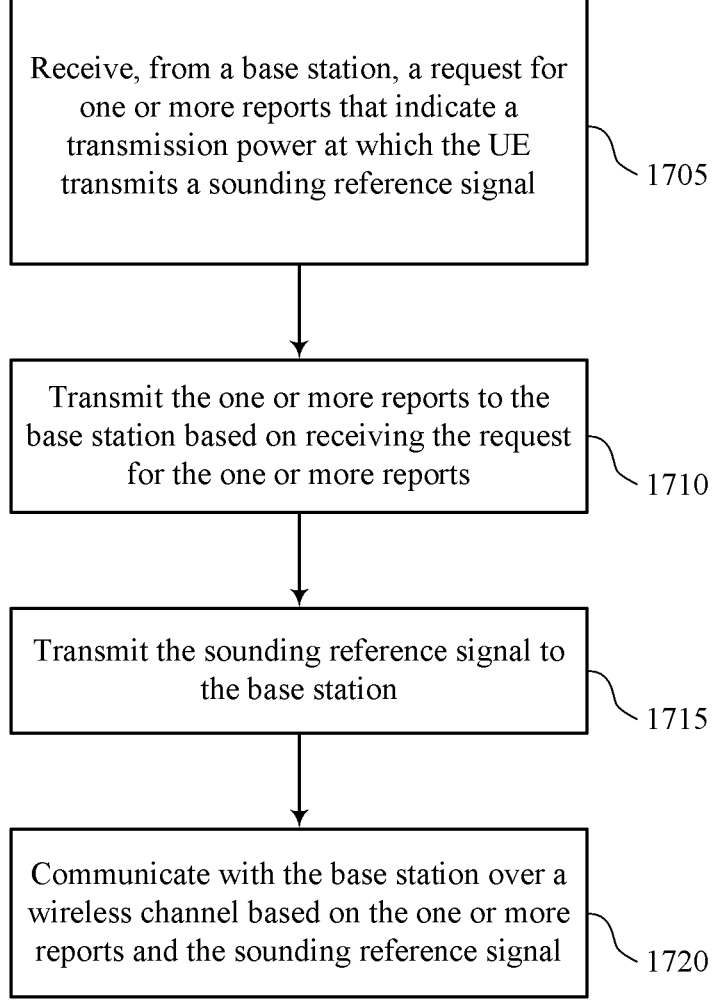

Receive, from a base station, a request for one or more reports that indicate a transmission power at which the UE transmits a sounding reference signal

1705

Transmit the one or more reports to the base station based on receiving the request for the one or more reports

1710

Transmit the sounding reference signal to the base station

1715

Communicate with the base station over a wireless channel based on the one or more reports and the sounding reference signal

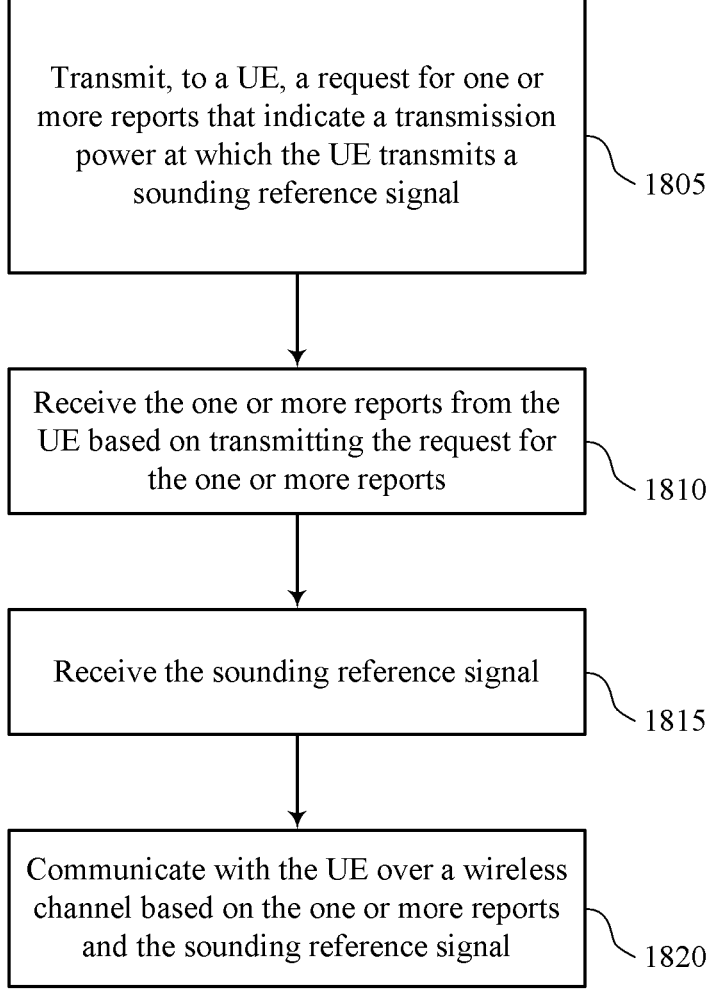

Transmit, to a UE, a request for one or more reports that indicate a transmission power at which the UE transmits a sounding reference signal — 1805

Receive the one or more reports from the UE based on transmitting the request for the one or more reports — 1810

Receive the sounding reference signal — 1815

Communicate with the UE over a wireless channel based on the one or more reports and the sounding reference signal — 1820

SRS POWER CONTROL METHODS FOR CHANNEL ESTIMATION OF RECONFIGURABLE INTELLIGENT SURFACE LINK

CROSS REFERENCE

The present Application is a 371 national stage filing of International PCT Application No. PCT/CN2020/120380 by CHOI et al. entitled "SRS POWER CONTROL METHODS FOR CHANNEL ESTIMATION OF RECONFIGURABLE INTELLIGENT SURFACE LINK," filed Oct. 12, 2020, which is assigned to the assignee hereof, and which is expressly incorporated by reference in its entirety herein.

FIELD OF TECHNOLOGY

The following relates to wireless communications, including sounding reference signal (SRS) power control methods for channel estimation of reconfigurable intelligent surface link.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a user equipment (UE) may communicate with a base station. In some examples, the base station may perform channel estimation to estimate how the channel between the UE and the base station affects signaling communicated in the channel. As the number of UEs communicating with the base station increases, the base station may have more overhead in estimating the channel conditions at each UE. Increased overhead may be undesirable in at least some circumstances.

SUMMARY

The described techniques relate to improved methods, systems, devices, and apparatuses that support SRS power control methods for channel estimation of reconfigurable intelligent surface link. Generally, the described techniques provide for a base station to determine a sounding reference signal transmission power at a user equipment (UE) such that the base station may perform channel estimation when the UE and base station communicate with each other via a configurable reflective surface. For instance, the base station may determine a sounding reference signal transmission power of the UE and may communicate with the UE according to the determined sounding reference signal transmission power. In some examples, the base station may transmit signaling to the UE indicating a switch from a first power control mode to a second power control mode. The UE may transmit, to the base station and in the second power control mode, a power headroom report which the base station may use to estimate the sounding reference signal transmission power. In other examples, the base station may transmit a request for one or more reports that indicate the sounding reference signal transmission power. The UE may transmit the one or more reports indicating the sounding reference signal transmission power to the base station.

A method for wireless communication at a UE is described. The method may include receiving, from a base station, signaling indicating a switch from a first power control mode to a second power control mode for sounding reference signal transmissions, transmitting, to the base station and in the second power control mode, a report indicating a power headroom associated with the sounding reference signal transmissions based on receiving the signaling indicating the switch, and communicating with the base station over a wireless channel based on transmitting the report indicating the power headroom.

An apparatus for wireless communication at a UE is described. The apparatus may include a processor, memory in electronic communication with the processor, and instructions stored in the memory. The instructions may be executable by the processor to cause the apparatus to receive, from a base station, signaling indicating a switch from a first power control mode to a second power control mode for sounding reference signal transmissions, transmit, to the base station and in the second power control mode, a report indicating a power headroom associated with the sounding reference signal transmissions based on receiving the signaling indicating the switch, and communicate with the base station over a wireless channel based on transmitting the report indicating the power headroom.

Another apparatus for wireless communication at a UE is described. The apparatus may include means for receiving, from a base station, signaling indicating a switch from a first power control mode to a second power control mode for sounding reference signal transmissions, means for transmitting, to the base station and in the second power control mode, a report indicating a power headroom associated with the sounding reference signal transmissions based on receiving the signaling indicating the switch, and means for communicating with the base station over a wireless channel based on transmitting the report indicating the power headroom.

A non-transitory computer-readable medium storing code for wireless communication at a UE is described. The code may include instructions executable by a processor to receive, from a base station, signaling indicating a switch from a first power control mode to a second power control mode for sounding reference signal transmissions, transmit, to the base station and in the second power control mode, a report indicating a power headroom associated with the sounding reference signal transmissions based on receiving the signaling indicating the switch, and communicate with the base station over a wireless channel based on transmitting the report indicating the power headroom.

In some examples of the method, apparatuses, and non-transitory computer-readable medium described herein, the first power control mode includes one of an open-loop power control mode or a closed-loop power control mode and the second power control mode includes the other of the open-loop power control mode and the closed-loop power control mode.

Some examples of the method, apparatuses, and non-transitory computer-readable medium described herein may further include operations, features, means, or instructions for transmitting, to the base station and in the second power control mode, a sounding reference signal associated with the report indicating the power headroom, where communicating with the base station may be based on transmitting the sounding reference signal.

In some examples of the method, apparatuses, and non-transitory computer-readable medium described herein, transmitting the report to the base station may include operations, features, means, or instructions for transmitting the report to the base station via a configurable reflective surface.

In some examples of the method, apparatuses, and non-transitory computer-readable medium described herein, receiving the signaling indicating the switch may include operations, features, means, or instructions for receiving the signaling indicating the switch from the base station via a configurable reflective surface.

In some examples of the method, apparatuses, and non-transitory computer-readable medium described herein, the signaling includes downlink control information indicating the switch, a medium access control (MAC) control element indicating the switch, or radio resource control signaling indicating the switch.

A method for wireless communication at a base station is described. The method may include transmitting, to a UE, signaling indicating a switch from a first power control mode to a second power control mode for sounding reference signal transmissions, receiving, from the UE and in the second power control mode, a report indicating a power headroom associated with the sounding reference signal transmissions based on transmitting the signaling indicating the switch, estimating a sounding reference signal transmission power based on receiving the report indicating the power headroom, and communicating with the UE over a wireless channel based on the estimated sounding reference signal transmission power.

An apparatus for wireless communication at a base station is described. The apparatus may include a processor, memory in electronic communication with the processor, and instructions stored in the memory. The instructions may be executable by the processor to cause the apparatus to transmit, to a UE, signaling indicating a switch from a first power control mode to a second power control mode for sounding reference signal transmissions, receive, from the UE and in the second power control mode, a report indicating a power headroom associated with the sounding reference signal transmissions based on transmitting the signaling indicating the switch, estimate a sounding reference signal transmission power based on receiving the report indicating the power headroom, and communicate with the UE over a wireless channel based on the estimated sounding reference signal transmission power.

Another apparatus for wireless communication at a base station is described. The apparatus may include means for transmitting, to a UE, signaling indicating a switch from a first power control mode to a second power control mode for sounding reference signal transmissions, means for receiving, from the UE and in the second power control mode, a report indicating a power headroom associated with the sounding reference signal transmissions based on transmitting the signaling indicating the switch, means for estimating a sounding reference signal transmission power based on receiving the report indicating the power headroom, and means for communicating with the UE over a wireless channel based on the estimated sounding reference signal transmission power.

A non-transitory computer-readable medium storing code for wireless communication at a base station is described. The code may include instructions executable by a processor to transmit, to a UE, signaling indicating a switch from a first power control mode to a second power control mode for sounding reference signal transmissions, receive, from the UE and in the second power control mode, a report indicating a power headroom associated with the sounding reference signal transmissions based on transmitting the signaling indicating the switch, estimate a sounding reference signal transmission power based on receiving the report indicating the power headroom, and communicate with the UE over a wireless channel based on the estimated sounding reference signal transmission power.

In some examples of the method, apparatuses, and non-transitory computer-readable medium described herein, the first power control mode includes one of an open-loop power control mode or a closed-loop power control mode and the second power control mode includes the other of the open-loop power control mode and the closed-loop power control mode.

Some examples of the method, apparatuses, and non-transitory computer-readable medium described herein may further include operations, features, means, or instructions for determining a value of a first channel condition parameter associated with the UE based on the estimated sounding reference signal transmission power associated with the report indicating the power headroom and a value of a second channel condition parameter associated with a second UE, where communicating with the UE over the wireless channel may be based on determining the value of the first channel condition parameter.

In some examples of the method, apparatuses, and non-transitory computer-readable medium described herein, receiving the report indicating the power headroom from the UE may include operations, features, means, or instructions receiving the report from the UE via a configurable reflective surface, and the methods, apparatuses, and non-transitory computer-readable medium may further include operations, features, means, or instructions for determining a value of a scalar factor associated with a channel condition between the UE and the configurable reflective surface based on the estimated sounding reference signal transmission power associated with the report indicating the power headroom, where determining the value of the first channel condition parameter includes combining the value of the scalar factor and the value of the second channel condition parameter.

Some examples of the method, apparatuses, and non-transitory computer-readable medium described herein may further include operations, features, means, or instructions for receiving, from the UE and in the second power control mode, a sounding reference signal associated with the report indicating the power headroom, where determining the value of the scalar factor may be based on receiving the sounding reference signal.

In some examples of the method, apparatuses, and non-transitory computer-readable medium described herein, the first channel condition parameter and the second channel condition parameter may be each associated with a same channel condition between the configurable reflective surface and the base station/

In some examples of the method, apparatuses, and non-transitory computer-readable medium described herein, receiving the report indicating the power headroom from the UE may include operations, features, means, or instructions for receiving the report indicating the power headroom from the UE via a configurable reflective surface.

In some examples of the method, apparatuses, and non-transitory computer-readable medium described herein, transmitting the signaling indicating the switch to the UE may include operations, features, means, or instructions for transmitting the signaling indicating the switch to the UE via reflection or refraction by a configurable reflective surface.

In some examples of the method, apparatuses, and non-transitory computer-readable medium described herein, the signaling includes downlink control information indicating the switch, a medium access control (MAC) control element indicating the switch, or radio resource control signaling indicating the switch.

A method for wireless communication at a UE is described. The method may include receiving, from a base station, a request for one or more reports that indicate a transmission power at which the UE transmits a sounding reference signal, transmitting the one or more reports to the base station based on receiving the request for the one or more reports, transmitting the sounding reference signal to the base station, and communicating with the base station over a wireless channel based on the one or more reports and the sounding reference signal.

An apparatus for wireless communication at a UE is described. The apparatus may include a processor, memory in electronic communication with the processor, and instructions stored in the memory. The instructions may be executable by the processor to cause the apparatus to receive, from a base station, a request for one or more reports that indicate a transmission power at which the UE transmits a sounding reference signal, transmit the one or more reports to the base station based on receiving the request for the one or more reports, transmit the sounding reference signal to the base station, and communicate with the base station over a wireless channel based on the one or more reports and the sounding reference signal.

Another apparatus for wireless communication at a UE is described. The apparatus may include means for receiving, from a base station, a request for one or more reports that indicate a transmission power at which the UE transmits a sounding reference signal, means for transmitting the one or more reports to the base station based on receiving the request for the one or more reports, means for transmitting the sounding reference signal to the base station, and means for communicating with the base station over a wireless channel based on the one or more reports and the sounding reference signal.

A non-transitory computer-readable medium storing code for wireless communication at a UE is described. The code may include instructions executable by a processor to receive, from a base station, a request for one or more reports that indicate a transmission power at which the UE transmits a sounding reference signal, transmit the one or more reports to the base station based on receiving the request for the one or more reports, transmit the sounding reference signal to the base station, and communicate with the base station over a wireless channel based on the one or more reports and the sounding reference signal.

In some examples of the method, apparatuses, and non-transitory computer-readable medium described herein, transmitting the sounding reference signal to the base station may include operations, features, means, or instructions for transmitting the sounding reference signal to the base station via a configurable reflective surface.

In some examples of the method, apparatuses, and non-transitory computer-readable medium described herein, receiving the request from the base station may include operations, features, means, or instructions for receiving the request from the base station via a configurable reflective surface.

In some examples of the method, apparatuses, and non-transitory computer-readable medium described herein, transmitting the one or more reports to the base station may include operations, features, means, or instructions for transmitting the one or more reports to the base station via a configurable reflective surface.

Some examples of the method, apparatuses, and non-transitory computer-readable medium described herein may further include operations, features, means, or instructions for downlink control information includes the request, a medium access control (MAC) control element includes the request, or radio resource control signaling includes the request.

In some examples of the method, apparatuses, and non-transitory computer-readable medium described herein, transmitting the one or more reports to the base station may include operations, features, means, or instructions for transmitting, to the base station, uplink control information that includes the one or more reports.

In some examples of the method, apparatuses, and non-transitory computer-readable medium described herein, the uplink control information may be transmitted periodically via an uplink control channel transmission, transmitted via an uplink shared channel transmission, or both.

In some examples of the method, apparatuses, and non-transitory computer-readable medium described herein, the one or more reports include a set of reports, where one or more bits from each of the set of reports cumulatively indicate the transmission power.

In some examples of the method, apparatuses, and non-transitory computer-readable medium described herein, the set of reports include a first report and a second report, where the one or more bits of the first report include a set of most significant bits corresponding to the transmission power and the one or more bits of the second report include a set of least significant bits corresponding to the transmission power.

In some examples of the method, apparatuses, and non-transitory computer-readable medium described herein, each report of the set of reports may be transmitted within a different uplink slot.

In some examples of the method, apparatuses, and non-transitory computer-readable medium described herein, the sounding reference signal may be transmitted after the one or more reports may be transmitted.

A method for wireless communication at a base station is described. The method may include transmitting, to a UE, a request for one or more reports that indicate a transmission power at which the UE transmits a sounding reference signal, receiving the one or more reports from the UE based on transmitting the request for the one or more reports, receiving the sounding reference signal, and communicating with the UE over a wireless channel based on the one or more reports and the sounding reference signal.

An apparatus for wireless communication at a base station is described. The apparatus may include a processor, memory in electronic communication with the processor, and instructions stored in the memory. The instructions may be executable by the processor to cause the apparatus to transmit, to a UE, a request for one or more reports that indicate a transmission power at which the UE transmits a sounding reference signal, receive the one or more reports from the UE based on transmitting the request for the one or more reports, receive the sounding reference signal, and communicate with the UE over a wireless channel based on the one or more reports and the sounding reference signal.

Another apparatus for wireless communication at a base station is described. The apparatus may include means for transmitting, to a UE, a request for one or more reports that indicate a transmission power at which the UE transmits a sounding reference signal, means for receiving the one or more reports from the UE based on transmitting the request for the one or more reports, means for receiving the sounding reference signal, and means for communicating with the UE over a wireless channel based on the one or more reports and the sounding reference signal.

A non-transitory computer-readable medium storing code for wireless communication at a base station is described. The code may include instructions executable by a processor to transmit, to a UE, a request for one or more reports that indicate a transmission power at which the UE transmits a sounding reference signal, receive the one or more reports from the UE based on transmitting the request for the one or more reports, receive the sounding reference signal, and communicate with the UE over a wireless channel based on the one or more reports and the sounding reference signal.

Some examples of the method, apparatuses, and non-transitory computer-readable medium described herein may further include operations, features, means, or instructions for determining a value of a first channel condition parameter associated with the UE based on the one or more reports and a value of a second channel condition parameter associated with a second UE, where communicating with the UE over the wireless channel may be based on determining the value of the first channel condition parameter.

In some examples of the method, apparatuses, and non-transitory computer-readable medium described herein, receiving the sounding reference signal from the UE may include operations, features, means, or instructions for receiving the sounding reference signal via a configurable reflective surface, and the method, apparatuses, and non-transitory computer-readable medium described herein may further include operations, features, means, or instructions for determining a value of a scalar factor associated with a channel condition between the UE and the configurable reflective surface based on the one or more reports, where determining the value of the first channel condition parameter includes combining the value of the scalar factor and the value of the second channel condition parameter.

In some examples of the method, apparatuses, and non-transitory computer-readable medium described herein, the first channel condition parameter and the second channel condition parameter may be each associated with a same channel condition between the configurable reflective surface and the base station.

In some examples of the method, apparatuses, and non-transitory computer-readable medium described herein, receiving the sounding reference signal from the UE may include operations, features, means, or instructions for receiving the sounding reference signal from the UE via a configurable reflective surface.

In some examples of the method, apparatuses, and non-transitory computer-readable medium described herein, transmitting the request to the UE may include operations, features, means, or instructions for transmitting the request to the UE via a configurable reflective surface.

In some examples of the method, apparatuses, and non-transitory computer-readable medium described herein, receiving the one or more reports from the base station may include operations, features, means, or instructions for receiving the one or more reports from the base station via a configurable reflective surface.

Some examples of the method, apparatuses, and non-transitory computer-readable medium described herein may further include operations, features, means, or instructions for downlink control information includes the request, a medium access control (MAC) control element includes the request, or radio resource control signaling includes the request.

In some examples of the method, apparatuses, and non-transitory computer-readable medium described herein, receiving the one or more reports from the UE may include operations, features, means, or instructions for receiving, from the UE, uplink control information that includes the one or more reports.

In some examples of the method, apparatuses, and non-transitory computer-readable medium described herein, the uplink control information may be received periodically via an uplink control channel transmission, received via an uplink shared channel transmission, or both.

In some examples of the method, apparatuses, and non-transitory computer-readable medium described herein, the one or more reports include a set of reports, where one or more bits from each of the set of reports cumulatively indicate the transmission power.

In some examples of the method, apparatuses, and non-transitory computer-readable medium described herein, the set of reports include a first report and a second report, where the one or more bits of the first report include a set of most significant bits corresponding to the transmission power and the one or more bits of the second report include a set of least significant bits corresponding to the transmission power.

In some examples of the method, apparatuses, and non-transitory computer-readable medium described herein, each report of the set of reports may be transmitted within a different uplink slot.

In some examples of the method, apparatuses, and non-transitory computer-readable medium described herein, the sounding reference signal may be received after the one or more reports may be received.

BRIEF DESCRIPTION OF THE DRAWINGS

FIGS. 14 through 18 show flowcharts illustrating methods that support SRS power control methods for channel estimation of reconfigurable intelligent surface link in accordance with aspects of the present disclosure.

DETAILED DESCRIPTION

Figure 1:
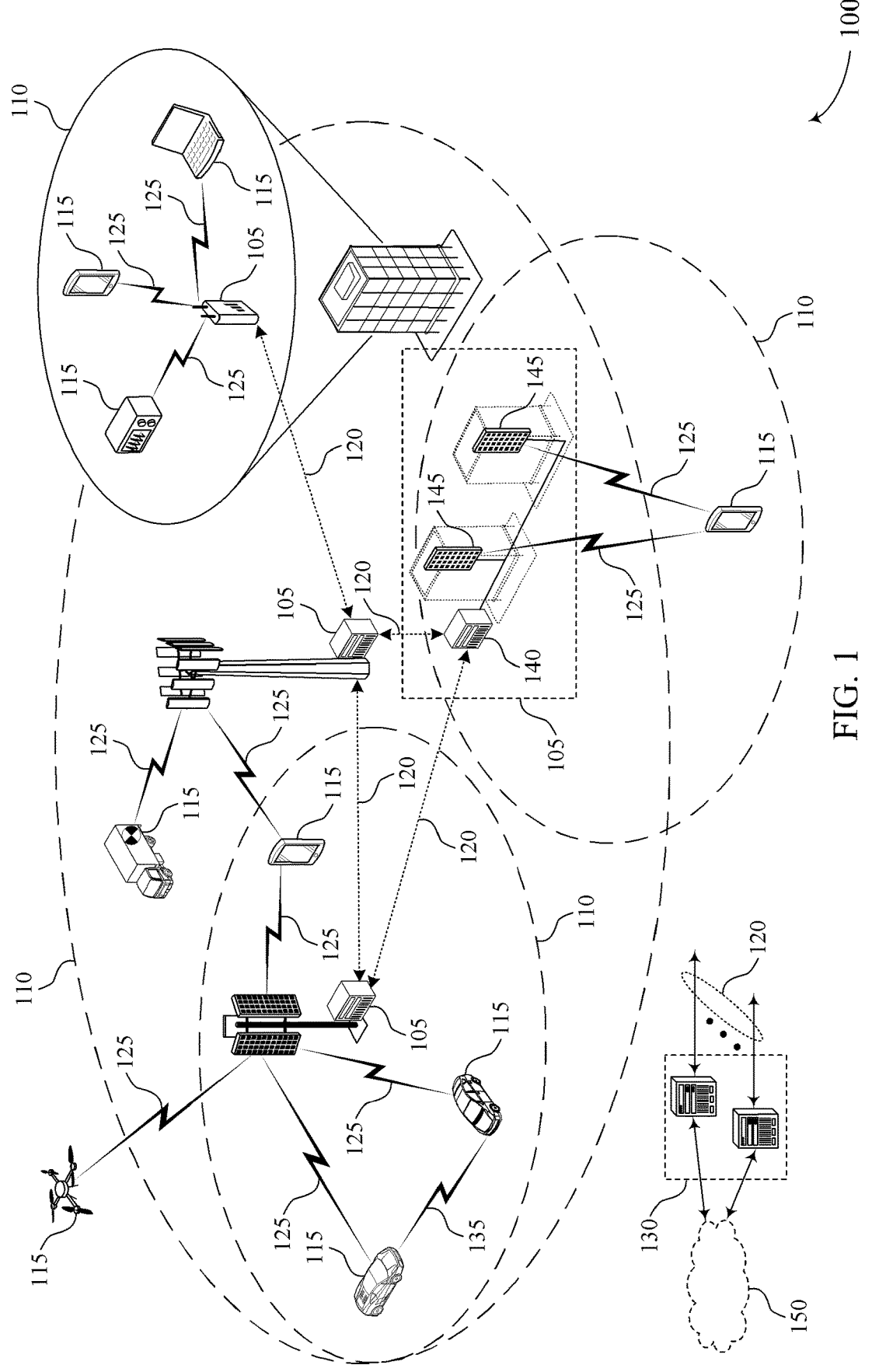
FIG. 1 illustrates an example of a system for wireless communications that supports SRS power control methods for channel estimation of reconfigurable intelligent surface link in accordance with aspects of the present disclosure.

A user equipment (UE) may communicate with a base station via a reconfigurable intelligent surface, which may be an example of a configurable reflective surface. The RIS may deflect (e.g., reflect, refract) communications received from one of the UE or the base station to the other of the UE or the base station, respectively. In some examples, the base station may perform channel estimation. As part of performing channel estimation, the base station may determine a value of a first channel condition parameter by combining a second channel condition parameter associated with a channel condition between the MS and the base station with a third channel condition parameter associated with a channel condition between the MS. Explicitly recalculating values of the second and third channel condition parameters for each UE communicating with the base station via the MS may be associated with overhead that linearly increases for each UE that communicates with the base station.

To lower this overhead, the base station may exploit one or more properties of the second and third channel condition parameters. For instance, the path between the MS and the base station may be at least approximately the same for each UE. As such, the base station may determine that the second channel condition parameter has at least approximately the same value for each UE. Additionally, the third channel condition parameter, which may be different for each UE, may be a scalar. As such, the base station may approximate the value of the first channel condition parameter for a first UE as a scaled version of the first channel condition parameter for a second UE as long as the base station has performed a full channel estimation for the second UE and has determined a value of the third channel parameter for the first UE. As such, the base station may perform channel estimation for multiple UEs with lower overhead.

The base station may determine the value of the third channel parameter using a sounding reference signal (SRS) transmission power at each UE. However, if the base station and the UE are communicating in a closed-loop power mode, the base station may be unable to accurately estimate the SRS transmission power. To enable the base station to estimate the transmission power, the base station may transmit, to the UE, a signaling indicating a switch from the closed-loop power mode to an open-loop power mode. Once the UE switches from the closed-loop power mode to the open-loop power mode, the UE may transmit a power headroom report (PHR) to the base station, which may indicate how far below the maximum transmission power that the UE transmits SRSs. The base station may use the PHR to determine relative pathloss associated with multiple UEs. Additionally or alternatively, the base station may transmit a request for one or more reports that indicate the SRS transmission power and may receive the one or more reports from the UE based on transmitting the request for the one or more reports.

Aspects of the disclosure are initially described in the context of wireless communications systems. Additional aspects of the disclosure are described in the context of a process flow. Aspects of the disclosure are further illustrated by and described with reference to apparatus diagrams, system diagrams, and flowcharts that relate to SRS power control methods for channel estimation of reconfigurable intelligent surface link.

FIG. 1 illustrates an example of a wireless communications system 100 that supports SRS power control methods for channel estimation of reconfigurable intelligent surface link in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook).

Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some examples, one or more wireless devices communicating according to NR (e.g., 5G) may use massive MIMO. Massive MIMO may achieve high beamforming gain by using active antenna units (AAU) and may involve the existence of individual radio frequency (RF) chains per antenna port. In some examples, using massive MIMO may increase power consumption due to the use of AAUs. To aid in extending 5G coverage without significant increases in power, an RIS (e.g., a configurable reflective surface) that deflects transmissions from wireless communication devices may be employed. The RIS may act as a mostly passive device that reflects an impinging wave into a desired direction. Additionally, the RIS may be controlled by a base station 105.

Generally the techniques described herein provide for a base station 105 to determine an SRS transmission power at a UE 115 such that the base station 105 may perform channel estimation when the UE 115 and base station 105 communicate with each other via an RIS. For instance, the base station 105 may determine a SRS transmission power of the UE 115 and may communicate with the UE 115 according to the determined sounding reference signal transmission power. In some examples, the base station 105 may transmit signaling to the UE 115 indicating a switch from a first power control mode to a second power control mode. The UE 115 may transmit, to the base station 105 and in the second power control mode, a PHR which the base station 105 may use to estimate the SRS transmission power and/or relative pathloss associated with multiple UEs 115. In other examples, the base station 105 may transmit a request for one or more reports that indicate the SRS transmission power based on the base station 105 operating in a closed-loop power control mode. The UE 115 may transmit the one or more reports indicating the SRS transmission power to the base station 105.

Figure 2A:
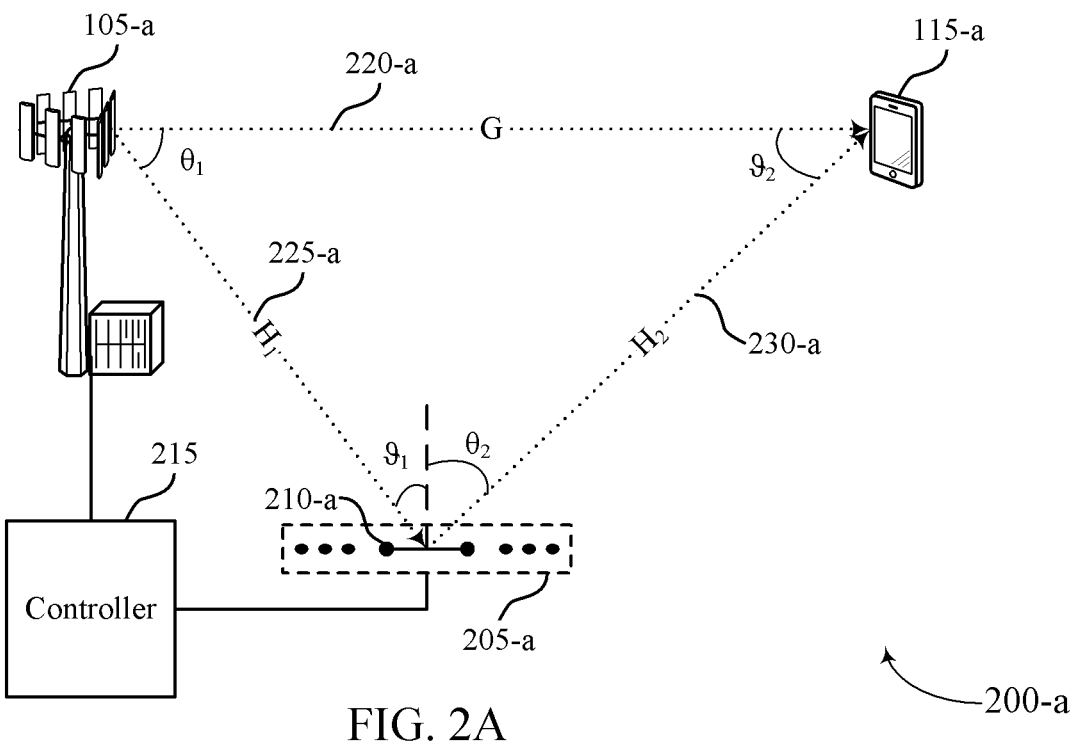
FIGS. 2A and 2B illustrate examples of wireless communications systems that support SRS power control methods for channel estimation of reconfigurable intelligent surface link in accordance with aspects of the present disclosure.

FIG. 2A illustrates an example of a wireless communications system 200-a that supports SRS power control methods for channel estimation of reconfigurable intelligent surface link in accordance with aspects of the present disclosure. In some examples, wireless communications systems 200-a may implement aspects of wireless communications system 100. For instance, base station 105-a may be an example of base stations 105 as described with reference to FIG. 1 and UE 115-a may be an example of a UE 115 as described with reference to FIG. 1.

Wireless communications system 200-a may include an RIS 205-a that includes N elements, including element 210-a. Each element of MS 205-a may be configured to deflect (e.g., reflect, refract) communications from UE 115-a and base station 105-a. Additionally, wireless communications system 200-a may include a controller 215 that may be coupled (e.g., via a wired or wireless connection) with base station 105-a and RIS 205-a. Controller 215 may be configured to receive commands from base station 105-a and to control MS 205-a according to the received commands. In some examples, base station 105-a may communicate using M antennas (e.g., transmit antennas). In some examples, UE 115-a may communicate using K antennas (e.g., receive antennas). In other examples, base station 105-a may communicate with K UEs 115.

When performing channel estimation, base station 105-a may communicate along a first path 220-a to estimate conditions of channel G and may communicate along a second path made up of paths 225-a and path 230-a to estimate conditions of channels $H_1$ and $H_2$, respectively. G may be a direct channel between base station 105-a and UE 115-a; $H_1$ may be a channel between base station 105-a and RIS 205-a; $H_2$ may be a channel between RIS 205-a and UE 115-a. In some examples, the RIS 205-a may be disabled (e.g., off) when base station 105-a estimates the channel conditions of channel G and may be enabled (e.g., on) when base station 105-a estimates the channel conditions of $H_1$ and $H_2$. In some examples, the value of $H_1$ may be common to each UE 115 communicating with base station 105-a. As described with reference to FIG. 2B, base station 105-a may exploit this channel property to reduce overhead while maintaining or improving channel estimation accuracy.

In some examples, the angle between the paths 220-a and 225-a at the base station 105-a may be given by $\theta_1$, the angle between paths 225-a and 230-a may be given by $\vartheta_1 + \theta_2$, and the angle between paths 230-a and 220-a may be given by $\vartheta_2$. $H_1$ may have a size of L×N and $H_2$ may have a size of M×L. In some examples, $H_1$ may be estimated as $$H_1 = \sqrt{\frac{K_1}{K_1+1}}\,\overline{H}_1 + \sqrt{\frac{1}{K_1+1}}\,\tilde{H}_1$$

and $H_2$ may be estimated as $$H_2 = \sqrt{\frac{K_2}{K_2+1}}\,\overline{H}_2 + \sqrt{\frac{1}{K_2+1}}\,\tilde{H}_2.$$

In some examples, base station 105-a may also estimate a channel F.

In some examples, base station 105-a may perform cascaded channel estimation, in which $H_1 H_2$ may not be separable or may be separable up to scaling only (e.g., depending on the channels). In some examples, channel $H_1$ may be quasi-static as there may be no significant or major mobility associated with path 225-a (e.g., path 230-a may be line of sight (LOS) dominant). As such, $H_1$ may be common to each UE 115 communicating with base station 105-a via the RIS 205-a. In some examples, a codebook for RIS 205-a may be determined as $\Phi^H \Phi = \alpha I$ with a maximum value for $\alpha$ (e.g., minimum variance estimation fora single UE 115).

Figure 2B:
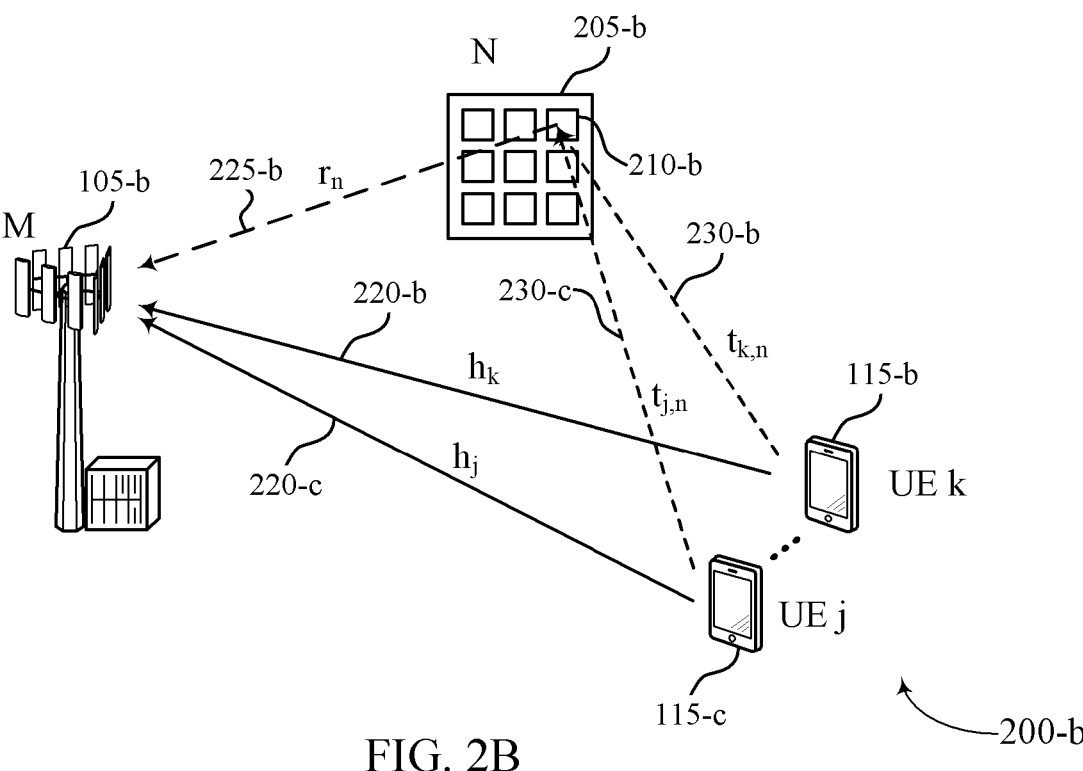

FIG. 2B illustrates an example of a wireless communications system 200-b that supports SRS power control methods for channel estimation of reconfigurable intelligent surface link in accordance with aspects of the present disclosure. In some examples, wireless communications systems 200-b may implement aspects of wireless communications system 100. For instance, base station 105-b may be an example of base stations 105 as described with reference to FIG. 1 and UEs 115-b and 115-c may be examples of UEs 115 as described with reference to FIG. 1.

Wireless communications system 200-b may include an RIS 205-b that includes N elements, including element 210-b. RIS 205-b may be configured to deflect (e.g., reflect, refract) communications from UE 115-b, UE 115-c, and base station 105-b. In some examples, base station 105-b may communicate using M antennas (e.g., transmit antennas). In some examples, base station 105-$a$ may communicate with K UEs 115 which include UEs 115-$b$ and 115-$c$, where UE 115-$b$ is the jth UE 115 and UE 115-$c$ is the kth UE 115 of the K UEs.

When performing channel estimation, base station 105-$b$ may communicate along a first path 220-$b$ to estimate conditions of channel $h_k$ for UE 115-$b$ and a second path 220-$c$ to estimate conditions of channel $h_j$ for UE 115-$c$. For instance, UE 115-$b$ may transmit a first SRS to base station 105-$b$ via first path 220-$b$ and UE 115-$c$ may transmit a second SRS to base station 105-$b$ via second path 220-$c$, and base station 105-$a$ may use the first SRS to estimate $h_k$ and the second SRS to estimate $h_j$. In some examples, the RIS 205-$b$ may be disabled (e.g., off) when base station 105-$b$ estimates $h_k$ and $h_j$. Additionally, when performing channel estimation, base station 105-$b$ may communicate along a third path made up of paths 225-$b$ and 230-$b$ to determine channel condition parameter $g_{k,n}$ for UE 115-$b$ and may communicate along a fourth path made up of paths 225-$b$ and 230-$c$ to determine channel condition parameter $g_{j,n}$ for UE 115-$c$. For instance, UE 115-$b$ may transmit a third SRS to base station 105-$b$ via the third path and UE 115-$c$ may transmit a fourth SRS to base station 105-$b$ via the fourth path, and base station 105-$a$ may use the third SRS to estimate $g_{k,n}$ and the fourth SRS to estimate $g_{j,n}$.

In some examples, $g_{k,n}$ may be determined as $g_{k,n}=t_{k,n}r_n$ where $t_{k,n}$ may be a channel condition parameter corresponding to a channel condition for path 230-$b$ and $r_n$ may be a channel condition parameter corresponding to a channel condition for path 225-$b$. Similarly, $g_{j,n}$ may be determined as $g_{j,n}=t_{j,n}r_n$, where $t_{j,n}$ may be a channel condition parameter corresponding to a channel condition for path 230-$c$. The same channel condition parameter $r_n$ may be used for channel estimations for both UE 115-$b$ and 115-$c$ due to the same path 225-$b$ being used channel estimation for both UE 115-$b$ and 115-$c$.

In some examples, $t_{k,n}$ and $t_{j,n}$ may be scalar values. As such, $g_{k,n}$ and $g_{j,n}$ may be related as $$g_{k,n} = \frac{t_{k,n}}{t_{j,n}} g_{j,n}, \text{ where } \frac{t_{k,n}}{t_{j,n}}$$

may be used to define scalar factor $\lambda_{k,n}$. By exploiting this relationship, base station 105-$b$ may perform channel estimation with less overhead than by individually performing channel estimation for each of the K UEs 115. In some examples, base station 105-$b$ performing channel estimation may involve base station 105-$b$ performing a three-step estimation process. For instance, with the RIS 205-$b$ disabled, base station 105-$b$ may determine [$h_1, \ldots, h_k$] (e.g., base station 105-$b$ may perform direct channel estimation of H[i] which may be associated with an overhead of 1). Next, with the RIS 205-$b$ enabled, base station 105-$b$ may estimate g (e.g., where j=1, for instance). For instance, base station 105-$b$ may estimate $$r'[i] = G_j[i]\phi^t s_j^t + n'[i]$$

where $G_j[i]$ may have a size of m×n and where t=1, 2 . . . N. In some such examples, the overhead may be N. Next, with the RIS 205-$b$ still enabled, base station 105-$b$ may estimate $\lambda_{k,n}$ for each of the remaining K UEs 115 and may determine $g_{k,n}$ according to $g_{k,n}=\lambda_{k,n}g_{j,n}$. For instance, base station 105-$b$ may determine $$r'[i] =$$
$$\sum\nolimits_{k \neq j} G_j[i]\text{diag}(\lambda_{k,n}[i])\phi^t s_k^t[i] + n[i] = \sum\nolimits_{k \neq j} s_k^t[i]G_j[i]\text{diag}(\phi^t)\lambda_k + n[i],$$

where $\lambda_k$ may have a size of N×1 and where $$t = 1, 2 \ldots, \left[\frac{N}{M}\right].$$

In some such examples, the overhead may be $$\left[\frac{N}{M}\right].$$

In some cases, the sum may be orthogonal.

Performing the three-step estimation may have one or more advantages. For instance, base station 105-$b$ may avoid estimating $g_{k,n}$ directly for all but one of the Us 115. Additionally, base station 105-$b$ may have a reduced number of channel coefficients and may also have reduced pilot overhead. The pilot overhead may be given as $$\tau = \tau_1 + \tau_2 + \tau_3 = K + N + \max\left(K - 1, \left[\frac{(K-1)N}{M}\right]\right).$$

In some examples, the three-estimation process may be condensed to two steps for subsequent channel estimation. For instance, as in the three steps and with the RIS 205-$b$ disabled, base station 105-$b$ may determine [$h_1, \ldots, h_k$] (e.g., base station 105-$b$ may perform direct channel estimation of H[i] which may be associated with an overhead of 1). For the second step, with the MS 205-$b$ enabled, base station 105-$b$ may estimate $\lambda_{k,n}$ for each of the K UEs 115. For instance, base station 105-$b$ may determine $$r'[i] = \sum\nolimits_k G_j[i]\text{diag}(\lambda_{k,n}[i])\phi^t s_k^t[i] + n[i] = \sum\nolimits_k s_k^t[i]G[i]\text{diag}(\phi^t)\lambda_k + n[i],$$

where $\lambda_k$ may have a size of N×1, where $$t = 1, 2 \ldots, \left[\frac{N}{M}\right],$$

and where G[i] may be reused from the three-step estimation process. In some such examples, the overhead may be $$\left[\frac{N}{M}\right].$$

In some cases, the sum may be orthogonal.

In some examples, UE 115-$b$ may use a different SRS transmit power to transmit an SRS along the third path made up of paths 225-$b$ and 230-$b$ as compared to the SRS transmit power used by UE 115-$c$ used to transmit an SRS along the fourth path made up of paths 225-*b* and 230-*c*. As such, when determining the scaling factor (e.g., $\lambda_{k,n}$ and/or $\lambda_k$), base station 105-*b* may account for the different SRS transmit powers at different UEs 115. However, if base station 105-*b* fails to identify an SRS transmit power for each UE 115, base station 105-*b* may be incapable of normalizing the scalar factor and may thus fail to perform channel estimation. One example in which base station 105-*b* may fail to identify the SRS transmit power is if base station 105-*b* and UEs 115-*b* and/or 115-*c* are operating in a closed-loop power control mode.

The methods as described herein are directed to enabling a base station, such as base station 105-*b*, to estimate a SRS transmit power of UEs (e.g., UEs 115-*b* and 115-*c*) communicating via an RIS (e.g., RIS 205-*b*). For instance, base station 105-*b* may transmit signaling to UEs 115-*b* and/or 115-*c* indicating a switch from a first power control mode (e.g., a closed-loop power control mode) to a second power control mode (e.g., an open-loop power control mode). UEs 115-*b* and/or 115-*c* may switch to the second power control mode and may transmit a PHR to base station 105-*b* that may indicate a power headroom which base station 105-*b* may use to estimate the SRS transmit power and/or relative path loss associated with multiple UEs 115 (e.g., UEs 115-*b* and 115-*c*). More details about this scenario may be described with reference to FIG. 3A. Additionally or alternatively, base station 105-*b* may transmit, to UEs 115-*b* and/or 115-*c*, a request for one or more reports that indicate an SRS transmission power at which UEs 115-*b* and/or 115-*c* transmit respective SRSs. UEs 115-*b* and/or 115-*c* may transmit the one or more reports to base station 105-*b* based on receiving the report and may determine the SRS transmission power from the one or more reports. More details about this scenario may be described with reference to FIG. 3B.

Figure 3A:
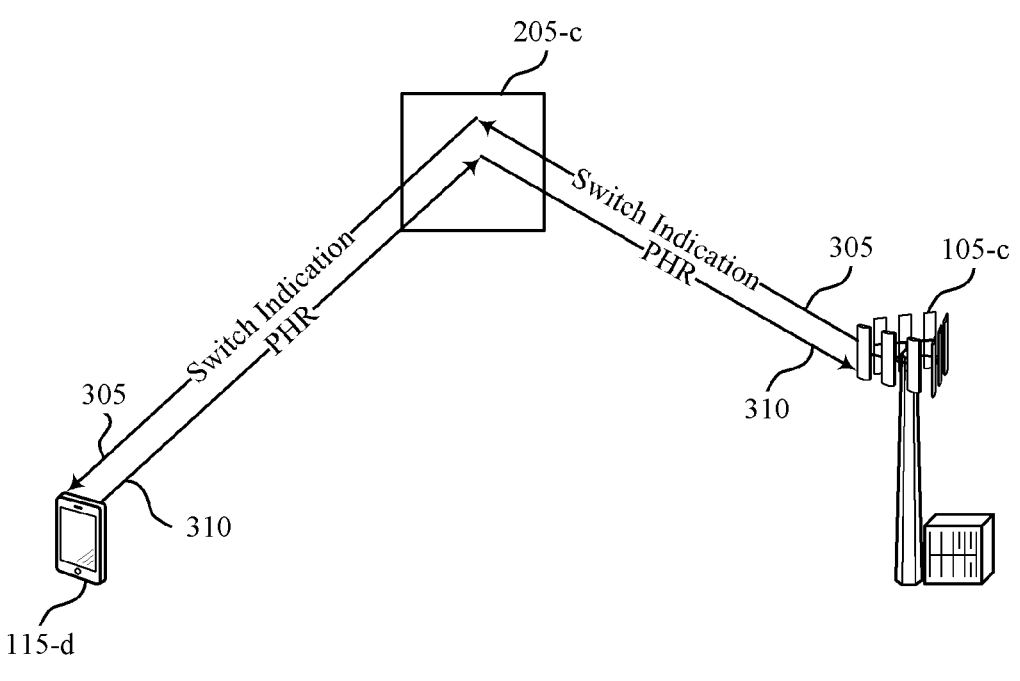
FIGS. 3A and 3B illustrate examples of wireless communications systems that support SRS power control methods for channel estimation of reconfigurable intelligent surface link in accordance with aspects of the present disclosure.

FIG. 3A illustrates an example of a wireless communications system 300-*a* that supports SRS power control methods for channel estimation of reconfigurable intelligent surface link in accordance with aspects of the present disclosure. In some examples, wireless communications system 300-*a* may implement aspects of wireless communications systems 100 and/or 200. For instance, base station 105-*c* may be an example of base station 105 as described with reference to FIG. 1, UE 115-*d* may be an example of a UE 115 as described with reference to FIG. 1, and RIS 205-*c* may be examples of RISs 205-*a* and/or 205-*b* as described with reference to FIG. 2.

Initially, base station 105-*c* and UE 115-*d* may communicate in a closed-loop power control mode. However, when base station 105-*c* is to perform channel estimation, base station 105-*c* may transmit signaling 305 to UE 115-*d* indicating a switch from the closed-loop power control mode to an open-loop power control mode. In some examples, MS 205-*c* may reflect the signaling 305 to UE 115-*d*. Alternatively, base station 105-*c* may transmit the signaling 305 directly to UE 115-*d*. In some examples, the signaling may include downlink control information (DCI) indicating the switch, a medium access control (MAC) control element indicating the switch, or radio resource control (RRC) signaling indicating the switch. In some examples, base station 105-*c* may transmit, to UE 115-*d*, signaling 305 indicating to switch from the open-loop power control mode to the closed-loop power control mode.

After receiving the signaling 305, UE 115-*d* may switch to the open-loop power control mode and may transmit, to base station 105-*c* in the open-loop power control mode, a report indicating a power headroom (e.g., a PHR 310)

associated with SRS transmissions transmitted from UE 115-*d*. In some examples, MS 205-*c* may reflect the PHR 310 to base station 105-*c*. Alternatively, UE 115-*d* may transmit the PHR 310 directly to base station 105-*c*.

After receiving the PHR 310, base station 105-*c* may estimate an SRS transmission power and/or relative path loss associated with multiple UEs 115 based on receiving the PHR 310. For instance, the PHR 310 may indicate by how much higher power a UE 115-*d* may transmit an SRS. From this indication, base station 105-*c* may estimate the SRS transmission power and/or relative path loss associated with multiple UEs 115. Once base station 105-*c* has estimated the SRS transmission power, base station 105-*c* may determine a value of a first channel condition parameter (e.g., $g_{k,n}$ if UE 115-*d* is the kth UE 115 of K UEs 115 and RIS 205-*c* has N elements) based on the estimated SRS transmission power and a value of a second channel condition parameter associated with a second UE 115 (e.g., $g_{j,n}$ if the second UE 115 is the jth UE 115 of the K UEs 115). In some examples, base station 105-*c* may determine a value of a scalar factor associated with a channel condition between UE 115-*d* and the RIS 205-*c* (e.g., $\lambda_{k,n}$) based on the estimated SRS transmission power. In some such examples, determining the value of the first channel condition parameter (e.g., $g_{k,n}$) may involve combining the value of the scalar factor with the value of the second channel condition parameter (e.g., $g_{k,n}=\lambda_{k,n}g_{j,n}$). In some examples, UE 115-*d* may transmit an SRS to base station 105-*c* (e.g., via RIS 205-*c*) and base station 105-*c* may determine the scalar factor based on receiving the SRS. In some examples, the first channel condition parameter and the second channel condition parameter may be each associated with a same channel condition (e.g., $r_n$) between RIS 205-*c* and base station 105-*c*. In some examples, base station 105-*c* may use the estimated SRS transmit power to normalize the scalar factor.

Figure 3B:
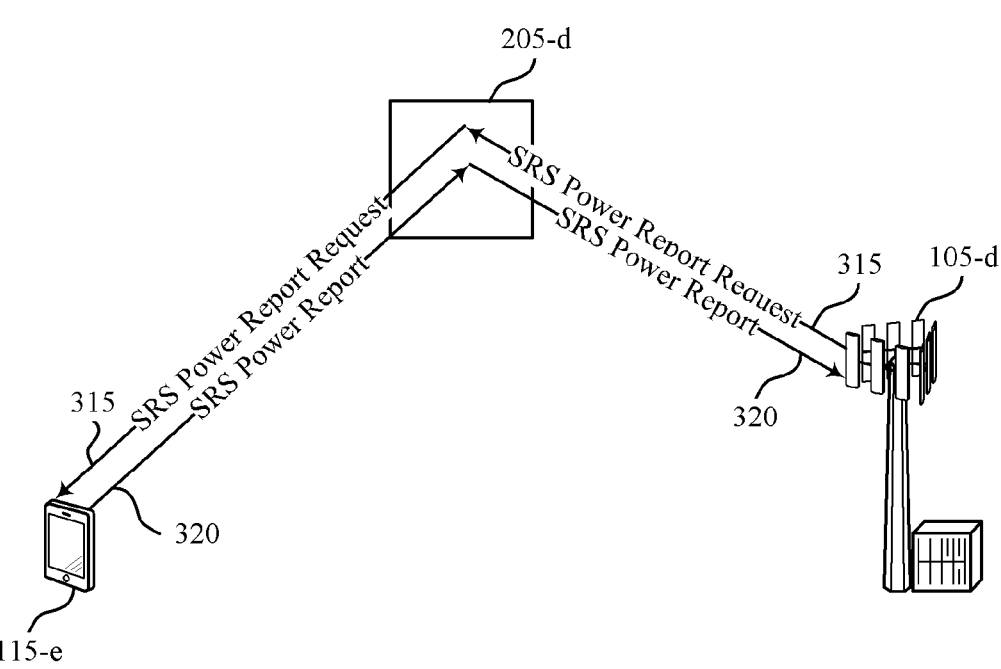

FIG. 3B illustrates an example of a wireless communications system 300-*b* that supports SRS power control methods for channel estimation of reconfigurable intelligent surface link in accordance with aspects of the present disclosure. In some examples, wireless communications system 300-*b* may implement aspects of wireless communications systems 100 and/or 200. For instance, base station 105-*d* may be an example of a base station 105 as described with reference to FIG. 1, UE 115-*e* may be an example of a UE 115 as described with reference to FIG. 1, and MS 205-*d* may be an example of RISs 205-*a* and/or 205-*b* as described with reference to FIG. 2.

Initially, base station 105-*d* and UE 115-*e* may communicate in a closed-loop power control mode. When base station 105-*c* is to perform channel estimation, base station 105-*d* may transmit a request 315 for one or more reports that indicate a transmission power at which UE 115-*e* transmits an SRS. In some examples, RIS 205-*d* may reflect the request 315 to UE 115-*e*. Alternatively, base station 105-*d* may transmit the request 315 directly to UE 115-*e*. In some examples, downlink control information (DCI), a medium access control (MAC) control element, or radio resource control (RRC) signaling may indicate the request.

After receiving the request, UE 115-*e* may transmit, to base station 105-*d*, the one or more reports 320. In some examples, UE 115-*e* may transmit the one or more reports via uplink control information (UCI) that is transmitted periodically (e.g., via a physical uplink control channel (PUCCH) transmission) and/or a transmitted via a physical uplink shared channel (PUSCH) transmission. In some examples, MS 205-*d* may reflect the one or more reports 320 to base station 105-*d*. Alternatively, UE 115-*e* may transmit the one or more reports 320 directly to base station 105-*d*. In some examples the one or more reports may include a set of reports, where one or more bits from each of the set of reports cumulatively indicate the SRS transmission power. For instance, the set of reports may include a first report and a second report, where the one or more bits of the first include a set of most significant bits (MSB) corresponding to the SRS transmission power and the one or more bits of the second report include a set of least significant bits (LSBs) corresponding to the transmission power. In some examples, each report of the set of reports is transmitted within a different uplink slot. Additionally or alternatively, each of the set of reports may be transmitted within a single slot (e.g., simultaneously).

After receiving the one or more reports, base station 105-*d* may determine the SRS transmission power. After determining the SRS transmission power, base station 105-*d* may determine a value of a first channel condition parameter (e.g., $g_{k,n}$ if UE 115-*e* is the kth UE 115 of K UEs 115 and RIS 205-*c* has N elements) based on the determined SRS transmission power and a value of a second channel condition parameter associated with a second UE 115 (e.g., $g_{j,n}$ if the second UE 115 is the jth UE 115 of the K UEs 115). In some examples, base station 105-*d* may determine a value of a scalar factor associated with a channel condition between UE 115-*e* and the RIS 205-*e* (e.g., $\lambda_{k,n}$) based on the determined SRS transmission power. In some such examples, determining the value of the first channel condition parameter (e.g., $g_{k,n}$) may involve combining the value of the scalar factor with the value of the second channel condition parameter (e.g., $g_{k,n}=\lambda_{k,n}g_{j,n}$). In some examples, UE 115-*e* may transmit an SRS to base station 105-*d* (e.g., via RIS 205-*d*) and base station 105-*d* may determine the scalar factor based on receiving the SRS. In some examples, the first channel condition parameter and the second channel condition parameter may be each associated with a same channel condition (e.g., $r_n$) between RIS 205-*d* and base station 105-*d*. In some examples, base station 105-*d* may use the determined SRS transmit power to normalize the scalar factor. It should be noted that in some examples, UE 115-*e* and base station 105-*d* may communicate the request 315 and the one or more reports 320 while operating in the open-loop power control mode.

Figure 4:
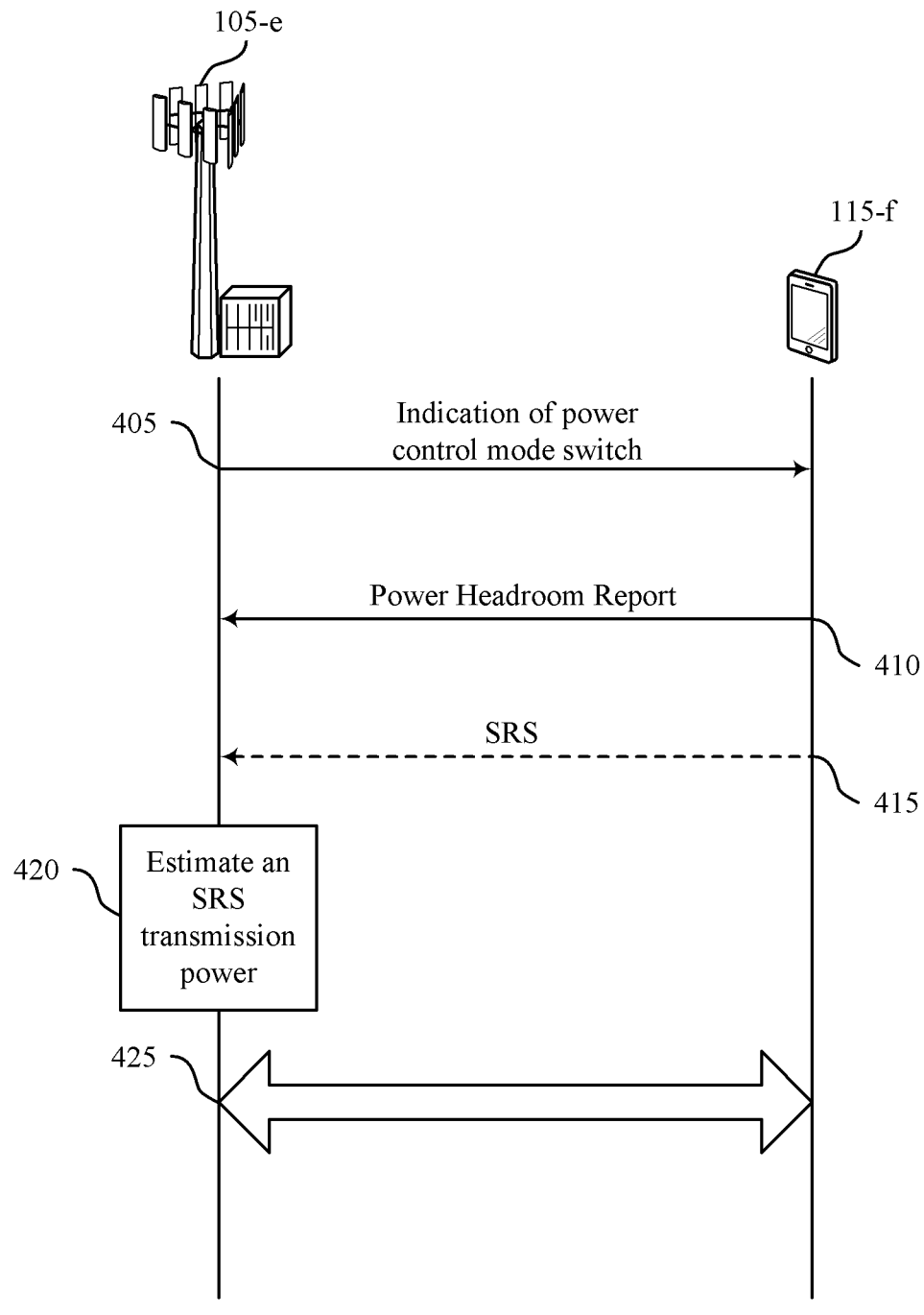
FIGS. 4 and 5 illustrate examples of process flows that support SRS power control methods for channel estimation of reconfigurable intelligent surface link in accordance with aspects of the present disclosure.

FIG. 4 illustrates an example of a process flow 400 that supports SRS power control methods for channel estimation of reconfigurable intelligent surface link in accordance with aspects of the present disclosure. In some examples, process flow 400 may be implemented by aspects of wireless communications systems 100 and/or 200. For instance, base station 105-*e* may be an example of a base station 105 as described with reference to FIG. 1 and UE 115-*f* may be an example of a UE 115 as described with reference to FIG. 1.

At 405, base station 105-*e* may transmit, to UE 115-*f*, signaling indicating a switch from a first power control mode to a second power control mode for SRS transmissions. In some examples, the first power control mode may include one of an open-loop power control mode or a closed-loop power control mode and the second power control mode may include the other of the open-loop power control mode and the closed-loop power control mode. In some examples, the signaling indicating the switch may be communicated via an MS. In some examples, the signaling may include DCI indicating the switch, a MAC-CE indicating the switch, or RRC signaling indicating the switch.

At 410, UE 115-*f* may transmit, to base station 105-*e* and in the second power control mode, a report indicating a power headroom (e.g., a PHR) associated with the sounding reference signal transmissions based on receiving the signaling indicating the switch. In some examples, the report indicating the power headroom may be communicated via an RIS.

At 415, UE 115-*f* may transmit, to the base station and in the second power control mode, an SRS associated with the report indicating the power headroom.

At 420, base station 105-*e* may estimate an SRS transmission power and/or a relative pathloss based on receiving the report indicating the power headroom.

At 425, base station 105-*e* and UE 115-*f* may communicate with each other over a wireless channel based on communicating the report indicating the power headroom. In some examples, base station 105-*e* may perform the communicating based on the estimated SRS transmission power. In some examples, the communicating may be based on UE 115-*f* communicating the sounding reference signal with base station 105-*e*.

In some examples, base station 105-*e* may determine a value of a first channel condition parameter associated with UE 115-*f* based on the estimated sounding reference signal transmission power and/or the relative path loss associated with the report indicating the power headroom and a value of a second channel condition parameter associated with a second UE 115. In some such examples, base station 105-*e* communicating with UE 115-*f* may be based on determining the value of the first channel condition parameter. In some cases where base station 105-*e* receives the report from UE 115-*f* via an RIS, base station 105-*e* may determine a value of a scalar factor associated with a channel condition between UE 115-*f* and the RIS based on the estimated sounding reference signal transmission power associated with the report indicating the power headroom, where determining the value of the first channel condition parameter includes combining the value of the scalar factor and the value of the second channel condition parameter. In some examples, base station 105-*e* may receive the SRS from UE 115-*f* and may determine the value of the scalar factor based on receiving the SRS. In some examples, the first channel condition parameter and the second channel condition parameter may be each associated with a same channel condition between the RIS and base station 105-*e*.

Figure 5:
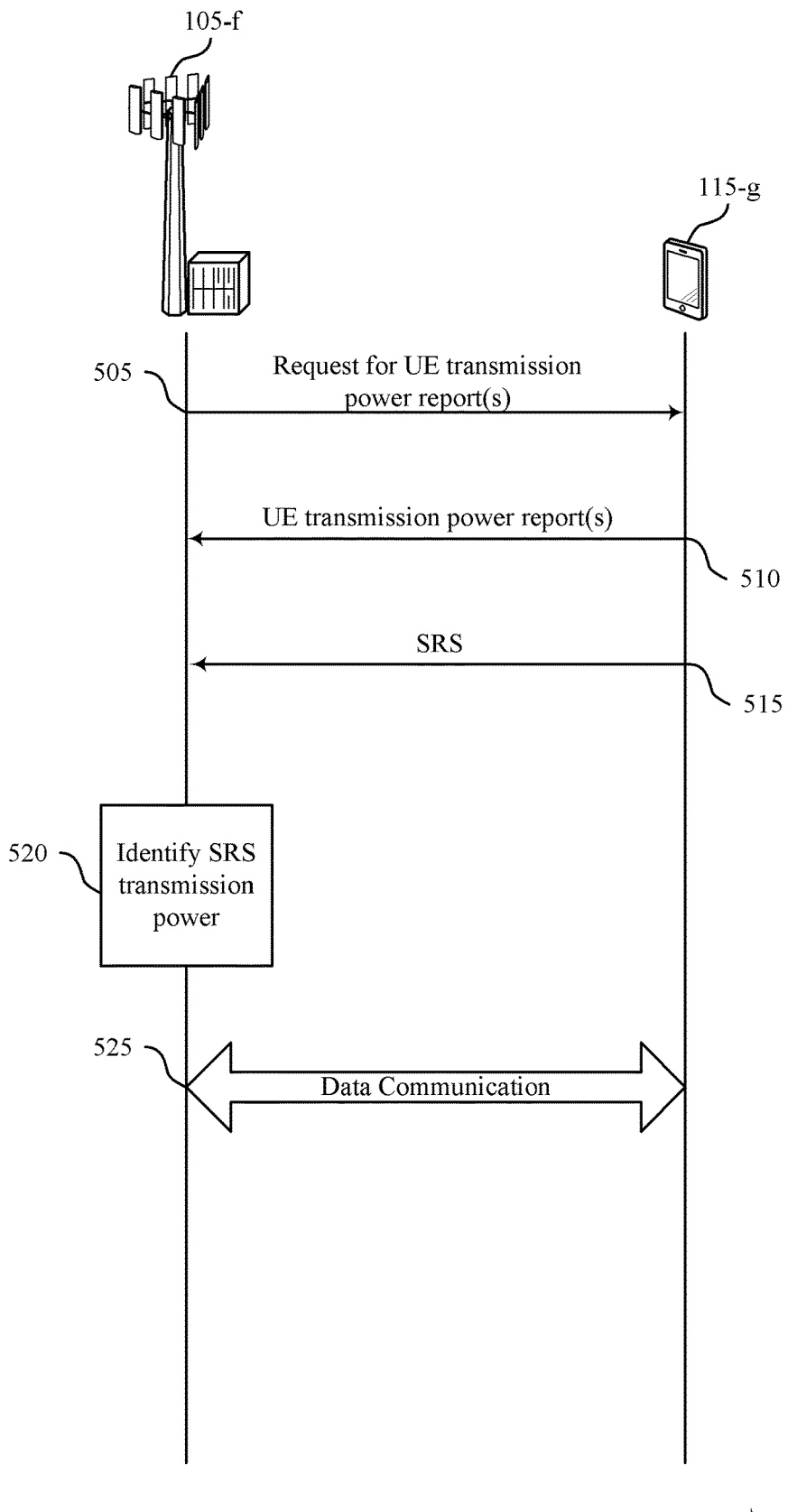

FIG. 5 illustrates an example of a process flow 500 that supports SRS power control methods for channel estimation of reconfigurable intelligent surface link in accordance with aspects of the present disclosure. In some examples, process flow 500 may be implemented by aspects of wireless communications systems 100 and/or 200. For instance, base station 105-*f* may be an example of a base station 105 as described with reference to FIG. 1 and UE 115-*g* may be an example of a UE 115 as described with reference to FIG. 1.

At 505, base station 105-*f* may transmit, to UE 115-*g*, a request for one or more reports that indicate a transmission power at which UE 115-*g* transmits a sounding reference signal (e.g., an SRS transmission power). In some examples, base station 105-*f* may transmit the request based on base station 105-*f* operating in a closed-loop power mode and UE 115-*g* may receive the request based on UE 115-*g* operating in the closed-loop power mode. The request may be communicated with UE 115-*g* via an MS. In some examples, the request may be included in DCI, a MAC-CE, or RRC signaling. In some examples, base station 105-*f* may transmit the request and/or UE 115-*g* may receive the request while operating in an open-loop power control mode.

At 510, UE 115-*g* may transmit, to base station 105-*f*, the one or more reports based on receiving the request for the one or more reports. The one or more reports may be communicated with base station 105-*f* via an RIS. In some examples, the one or more reports may be included in UCI. In some such examples, the UCI may be transmitted periodically via an uplink control channel transmission, transmitted via an uplink shared channel transmission, or both. In some examples, the one or more reports may include a set of reports, where one or more bits from each of the set of reports cumulatively indicate the transmission power. In some such examples, the set of reports include a first report and a second report, where the one or more bits of the first report include a set of MSBs corresponding to the transmission power and the one or more bits of the second report include a set of LSBs corresponding to the transmission power. Each report of the set of reports may be transmitted within a different uplink slot. In some examples, UE 115-*g* may transmit the one or more reports and/or base station 105-*f* may receive the one or more reports while operating in an open-loop power control mode.

At 515, UE 115-*g* may transmit, to base station 105-*f*, the SRS. The SRS may be communicated with base station 105-*f* via an RIS. In some examples, the SRS is communicated after the one or more reports are communicated.

At 520, base station 105-*f* may identify the SRS transmission power from the one or more reports. In some examples, base station 105-*f* may determine a value of a first channel condition parameter associated with UE 115-*g* based on the received report and a value of a second channel condition parameter associated with a second UE 115. In examples where the SRS is received via an RIS, base station 105-*e* may determine a value of a scalar factor associated with a channel condition between UE 115-*g* and the RIS based on the received report, where determining the value of the first channel condition parameter includes combining the value of the scalar factor and the value of the second channel condition parameter. In some examples, the first channel condition parameter and the second channel condition parameter may be each associated with a same channel condition between the MS and the base station.

At 525, UE 115-*g* and base station 105-*f* may communicate with each other over a wireless channel based on communicating the one or more reports and the sounding reference signal. In some examples, communicating with UE 115-*g* over the wireless channel is based on base station 105-*f* determining the value of the first channel condition parameter.

Figure 6:
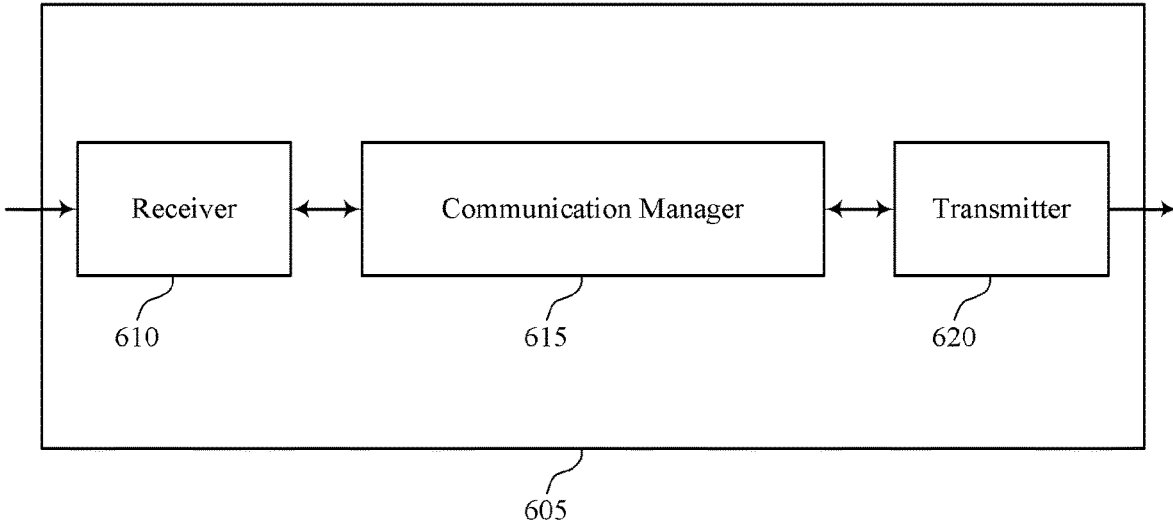
FIGS. 6 and 7 show block diagrams of devices that support SRS power control methods for channel estimation of reconfigurable intelligent surface link in accordance with aspects of the present disclosure.

FIG. 6 shows a block diagram 600 of a device 605 that supports SRS power control methods for channel estimation of reconfigurable intelligent surface link in accordance with aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to SRS power control methods for channel estimation of reconfigurable intelligent surface link, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may receive, from a base station, signaling indicating a switch from a first power control mode to a second power control mode for sounding reference signal transmissions; transmit, to the base station and in the second power control mode, a report indicating a power headroom associated with the sounding reference signal transmissions based on receiving the signaling indicating the switch; and communicate with the base station over a wireless channel based on transmitting the report indicating the power headroom. The communication manager 615 may also receive, from a base station, a request for one or more reports that indicate a transmission power at which the UE transmits a sounding reference signal; transmit the one or more reports to the base station based on receiving the request for the one or more reports; transmit the sounding reference signal to the base station; and communicate with the base station over a wireless channel based on the one or more reports and the sounding reference signal. The communication manager 615 may be an example of aspects of the communication manager 910 described herein.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

Figure 7:
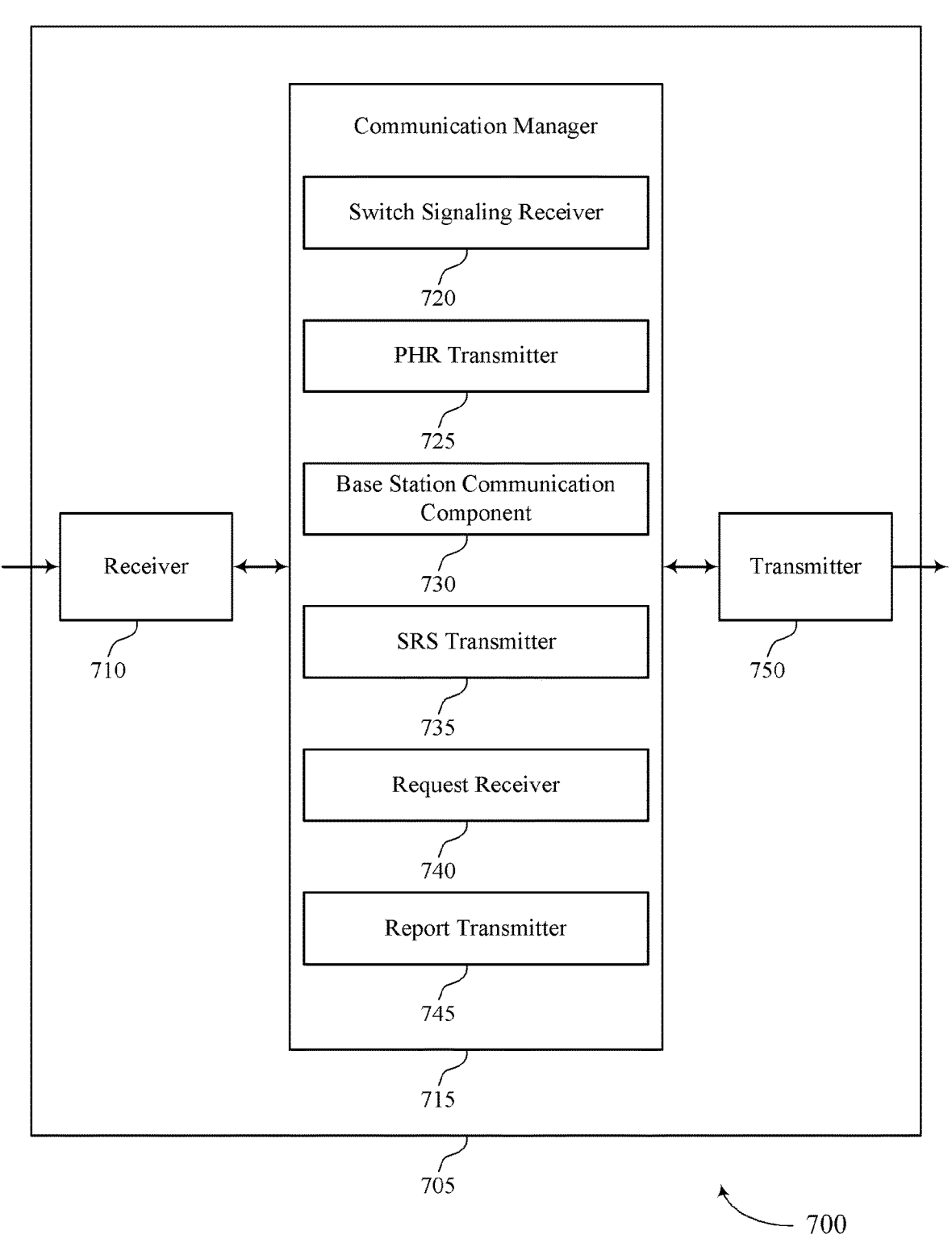

FIG. 7 shows a block diagram 700 of a device 705 that supports SRS power control methods for channel estimation of reconfigurable intelligent surface link in accordance with aspects of the present disclosure. The device 705 may be an example of aspects of a device 605, or a UE 115 as described herein. The device 705 may include a receiver 710, a communication manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to SRS power control methods for channel estimation of reconfigurable intelligent surface link, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include a switch signaling receiver 720, a PHR transmitter 725, a base station communication component 730, a SRS transmitter 735, a request receiver 740, and a report transmitter 745. The communication manager 715 may be an example of aspects of the communication manager 910 described herein.

The switch signaling receiver 720 may receive, from a base station, signaling indicating a switch from a first power control mode to a second power control mode for sounding reference signal transmissions.

The PHR transmitter 725 may transmit, to the base station and in the second power control mode, a report indicating a power headroom associated with the sounding reference signal transmissions based on receiving the signaling indicating the switch.

The base station communication component 730 may communicate with the base station over a wireless channel based on transmitting the report indicating the power headroom. The base station communication component 730 may communicate with the base station over a wireless channel based on the one or more reports and the sounding reference signal.

The SRS transmitter 735 may transmit a sounding reference signal to the base station.

The request receiver 740 may receive, from a base station, a request for one or more reports that indicate a transmission power at which the UE transmits a sounding reference signal.

The report transmitter 745 may transmit the one or more reports to the base station based on receiving the request for the one or more reports.

The transmitter 750 may transmit signals generated by other components of the device 705. In some examples, the transmitter 750 may be collocated with a receiver 710 in a transceiver module. For example, the transmitter 750 may be an example of aspects of the transceiver 915 described with reference to FIG. 9. The transmitter 750 may utilize a single antenna or a set of antennas.

Figure 8:
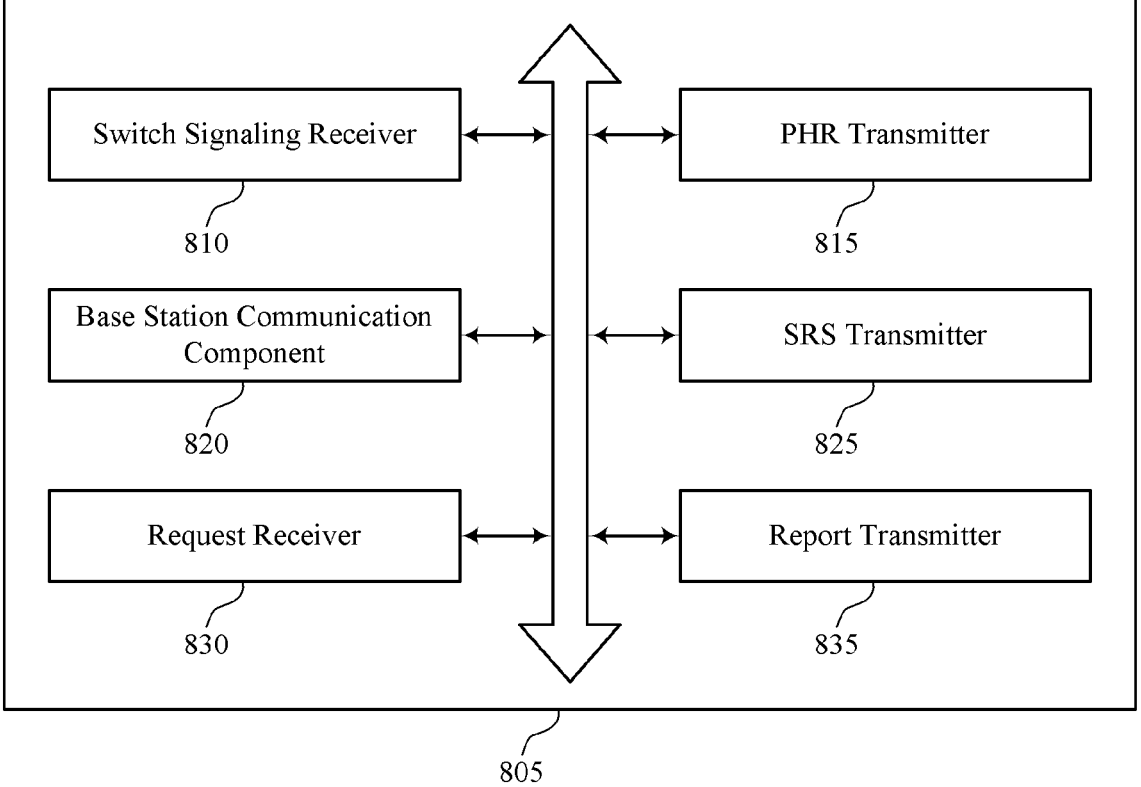
FIG. 8 shows a block diagram of a communication manager that supports SRS power control methods for channel estimation of reconfigurable intelligent surface link in accordance with aspects of the present disclosure.

FIG. 8 shows a block diagram 800 of a communication manager 805 that supports SRS power control methods for channel estimation of reconfigurable intelligent surface link in accordance with aspects of the present disclosure. The communication manager 805 may be an example of aspects of a communication manager 615, a communication manager 715, or a communication manager 910 described herein. The communication manager 805 may include a switch signaling receiver 810, a PHR transmitter 815, a base station communication component 820, a SRS transmitter 825, a request receiver 830, and a report transmitter 835. Each of these modules may communicate, directly or indirectly, with one another (e.g., via one or more buses).

The switch signaling receiver 810 may receive, from a base station, signaling indicating a switch from a first power control mode to a second power control mode for sounding reference signal transmissions. In some examples, the switch signaling receiver 810 may receive the signaling indicating the switch from the base station via a configurable reflective surface. In some cases, the first power control mode includes one of an open-loop power control mode or a closed-loop power control mode and the second power control mode includes the other of the open-loop power control mode and the closed-loop power control mode. In some cases, the signaling includes downlink control information indicating the switch, a medium access control (MAC) control element indicating the switch, or radio resource control signaling indicating the switch.

The PHR transmitter 815 may transmit, to the base station and in the second power control mode, a report indicating a power headroom associated with the sounding reference signal transmissions based on receiving the signaling indicating the switch. In some examples, the PHR transmitter 815 may transmit the report to the base station via a configurable reflective surface.

The base station communication component 820 may communicate with the base station over a wireless channel based on transmitting the report indicating the power headroom. In some examples, the base station communication component 820 may communicate with the base station over a wireless channel based on the one or more reports and the sounding reference signal.

The SRS transmitter 825 may transmit the sounding reference signal to the base station. In some examples, the sounding reference signal may be transmitted after the one or more reports are transmitted. In some examples, the SRS transmitter 825 may transmit, to the base station and in the second power control mode, a sounding reference signal associated with the report indicating the power headroom, where communicating with the base station is based on transmitting the sounding reference signal. In some examples, the SRS transmitter 825 may transmit the sounding reference signal to the base station via a configurable reflective surface.

The request receiver 830 may receive, from a base station, a request for one or more reports that indicate a transmission power at which the UE transmits a sounding reference signal. In some examples, the request receiver 830 may receive the request from the base station via a configurable reflective surface. In some examples, downlink control information includes the request, a medium access control (MAC) control element includes the request, or radio resource control signaling includes the request.

Figure 9:
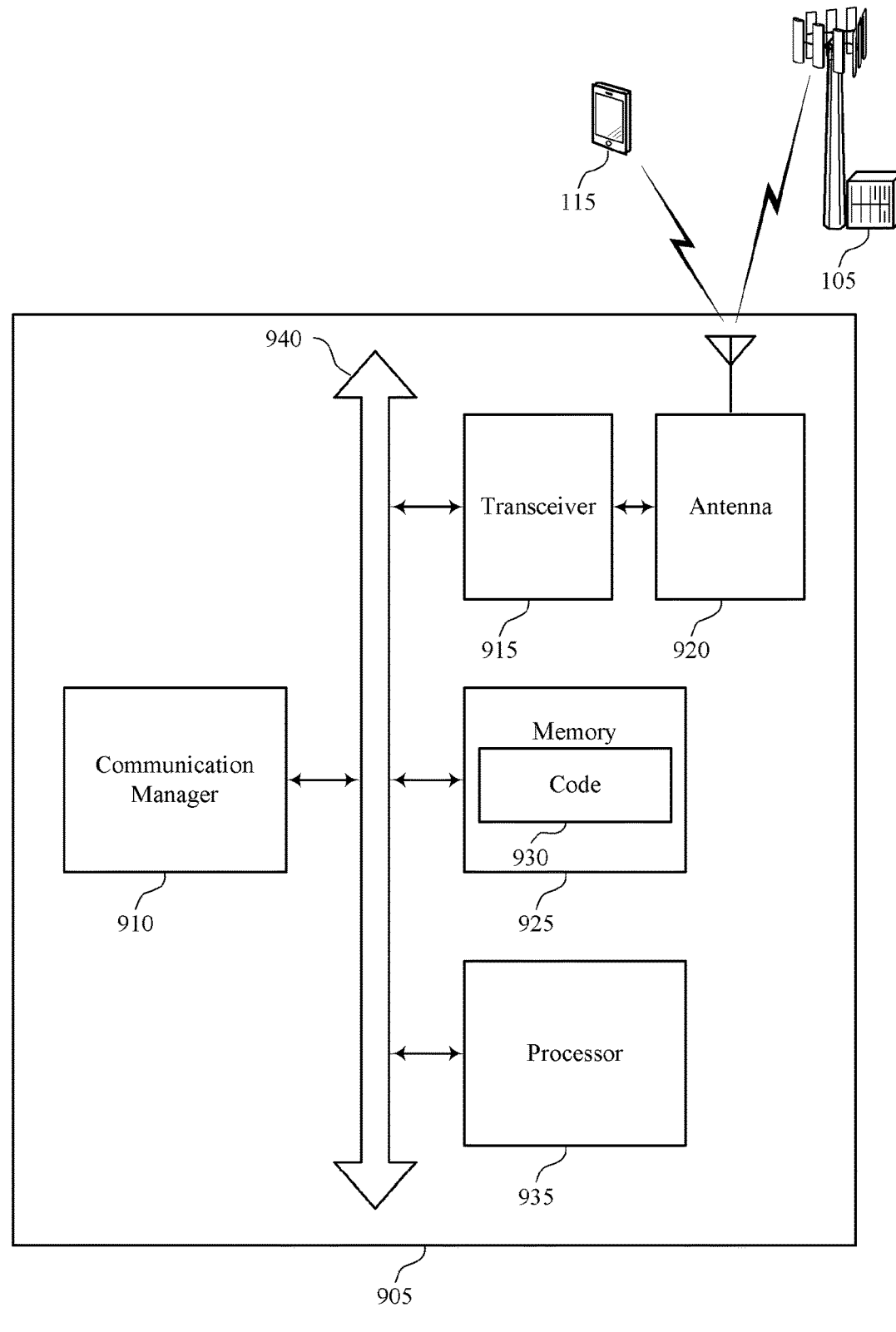
FIG. 9 shows a diagram of a system including a device that supports SRS power control methods for channel estimation of reconfigurable intelligent surface link in accordance with aspects of the present disclosure.

The report transmitter 835 may transmit the one or more reports to the base station based on receiving the request for the one or more reports. In some examples, the report transmitter 835 may transmit the one or more reports to the base station via a configurable reflective surface. In some examples, the report transmitter 835 may transmit, to the base station, uplink control information that includes the one or more reports. The uplink control information may be transmitted periodically via an uplink control channel transmission, transmitted via an uplink shared channel transmission or both. The set of reports may include a first report and a second report, where the one or more bits of the first report include a set of most significant bits corresponding to the transmission power and the one or more bits of the second report include a set of least significant bits corresponding to the transmission power. Each report of the set of reports may transmitted within a different uplink slot. In some examples, the one or more reports include a set of reports, where one or more bits from each of the set of reports cumulatively indicate the transmission power FIG. 9 shows a diagram of a system 900 including a device 905 that supports SRS power control methods for channel estimation of reconfigurable intelligent surface link in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may receive, from a base station, signaling indicating a switch from a first power control mode to a second power control mode for sounding reference signal transmissions; transmit, to the base station and in the second power control mode, a report indicating a power headroom associated with the sounding reference signal transmissions based on receiving the signaling indicating the switch; and communicate with the base station over a wireless channel based on transmitting the report indicating the power headroom. The communication manager 910 may also receive, from a base station, a request for one or more reports that indicate a transmission power at which the UE transmits a sounding reference signal; transmit the one or more reports to the base station based on receiving the request for the one or more reports; transmit the sounding reference signal to the base station; and communicate with the base station over a wireless channel based on the one or more reports and the sounding reference signal.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting SRS power control methods for channel estimation of reconfigurable intelligent surface link).

Figure 10:
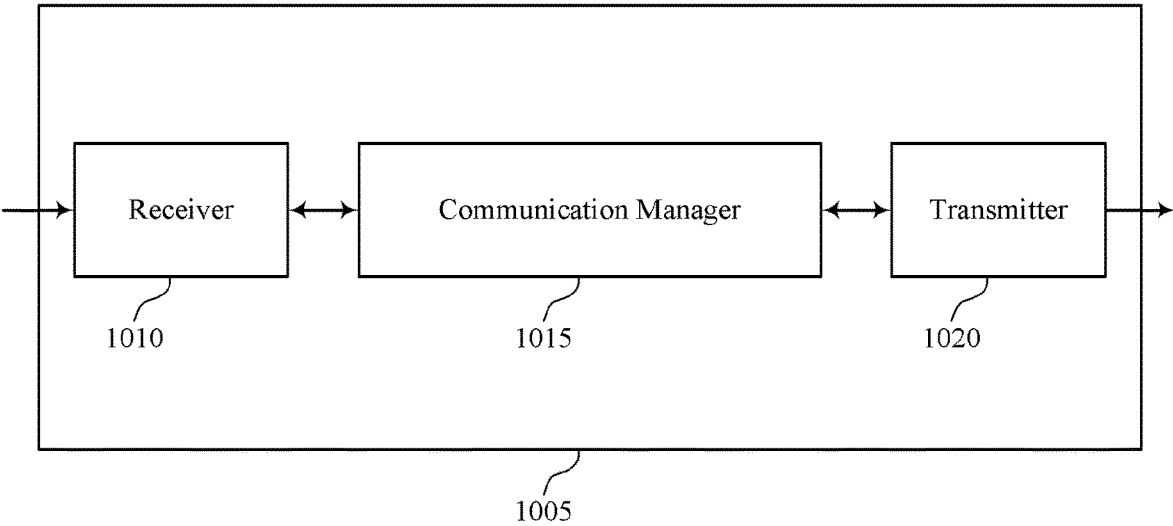
FIGS. 10 and 11 show block diagrams of devices that support SRS power control methods for channel estimation of reconfigurable intelligent surface link in accordance with aspects of the present disclosure.
Figure 10:
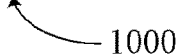

FIG. 10 shows a block diagram 1000 of a device 1005 that supports SRS power control methods for channel estimation of reconfigurable intelligent surface link in accordance with aspects of the present disclosure. The device 1005 may be an example of aspects of a base station 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to SRS power control methods for channel estimation of reconfigurable intelligent surface link, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may transmit, to a UE, signaling indicating a switch from a first power control mode to a second power control mode for sounding reference signal transmissions; receive, from the UE and in the second power control mode, a report indicating a power headroom associated with the sounding reference signal transmissions based on transmitting the signaling indicating the switch; estimate a sounding reference signal transmission power based on receiving the report indicating the power headroom; and communicate with the UE over a wireless channel based on the estimated sounding reference signal transmission power. The communication manager 1015 may also transmit, to a UE, a request for one or more reports that indicate a transmission power at which the UE transmits a sounding reference signal; receive the one or more reports from the UE based on transmitting the request for the one or more reports; receive the sounding reference signal from the UE; and communicate with the UE over a wireless channel based on the one or more reports and the sounding reference signal. The communication manager 1015 may be an example of aspects of the communication manager 1310 described herein.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
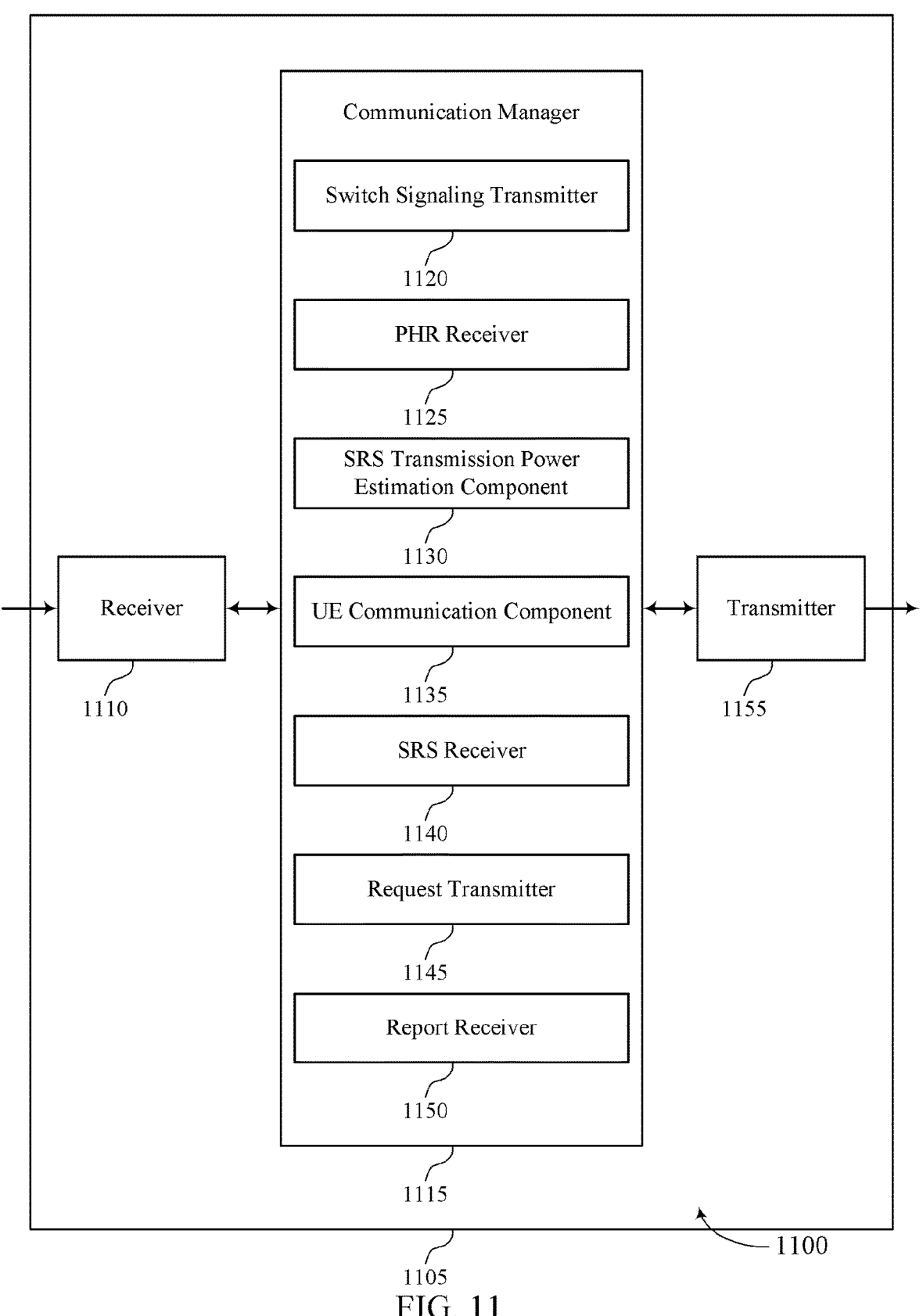

FIG. 11 shows a block diagram 1100 of a device 1105 that supports SRS power control methods for channel estimation of reconfigurable intelligent surface link in accordance with aspects of the present disclosure. The device 1105 may be an example of aspects of a device 1005, or a base station 105 as described herein. The device 1105 may include a receiver 1110, a communication manager 1115, and a transmitter 1155. The device 1105 may also include a processor. Each of these components may be in communication with one another (e.g., via one or more buses).

The receiver 1110 may receive information such as packets, user data, or control information associated with various information channels (e.g., control channels, data channels, and information related to SRS power control methods for channel estimation of reconfigurable intelligent surface link, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include a switch signaling transmitter 1120, a PHR receiver 1125, a SRS transmission power estimation component 1130, an UE communication component 1135, a SRS receiver 1140, a request transmitter 1145, and a report receiver 1150. The communication manager 1115 may be an example of aspects of the communication manager 1310 described herein.

The switch signaling transmitter 1120 may transmit, to a UE, signaling indicating a switch from a first power control mode to a second power control mode for sounding reference signal transmissions.

The PHR receiver 1125 may receive, from the UE and in the second power control mode, a report indicating a power headroom associated with the sounding reference signal transmissions based on transmitting the signaling indicating the switch.

The SRS transmission power estimation component 1130 may estimate a sounding reference signal transmission power based on receiving the report indicating the power headroom.

The UE communication component 1135 may communicate with the UE over a wireless channel based on the estimated sounding reference signal transmission power. The UE communication component 1135 may communicate with the UE over a wireless channel based on the one or more reports and the sounding reference signal.

The SRS receiver 1140 may receive the sounding reference signal from the UE.

The request transmitter 1145 may transmit, to a UE, a request for one or more reports that indicate a transmission power at which the UE transmits a sounding reference signal.

The report receiver 1150 may receive the one or more reports from the UE based on transmitting the request for the one or more reports.

The transmitter 1155 may transmit signals generated by other components of the device 1105. In some examples, the transmitter 1155 may be collocated with a receiver 1110 in a transceiver module. For example, the transmitter 1155 may be an example of aspects of the transceiver 1320 described with reference to FIG. 13. The transmitter 1155 may utilize a single antenna or a set of antennas.

Figure 12:
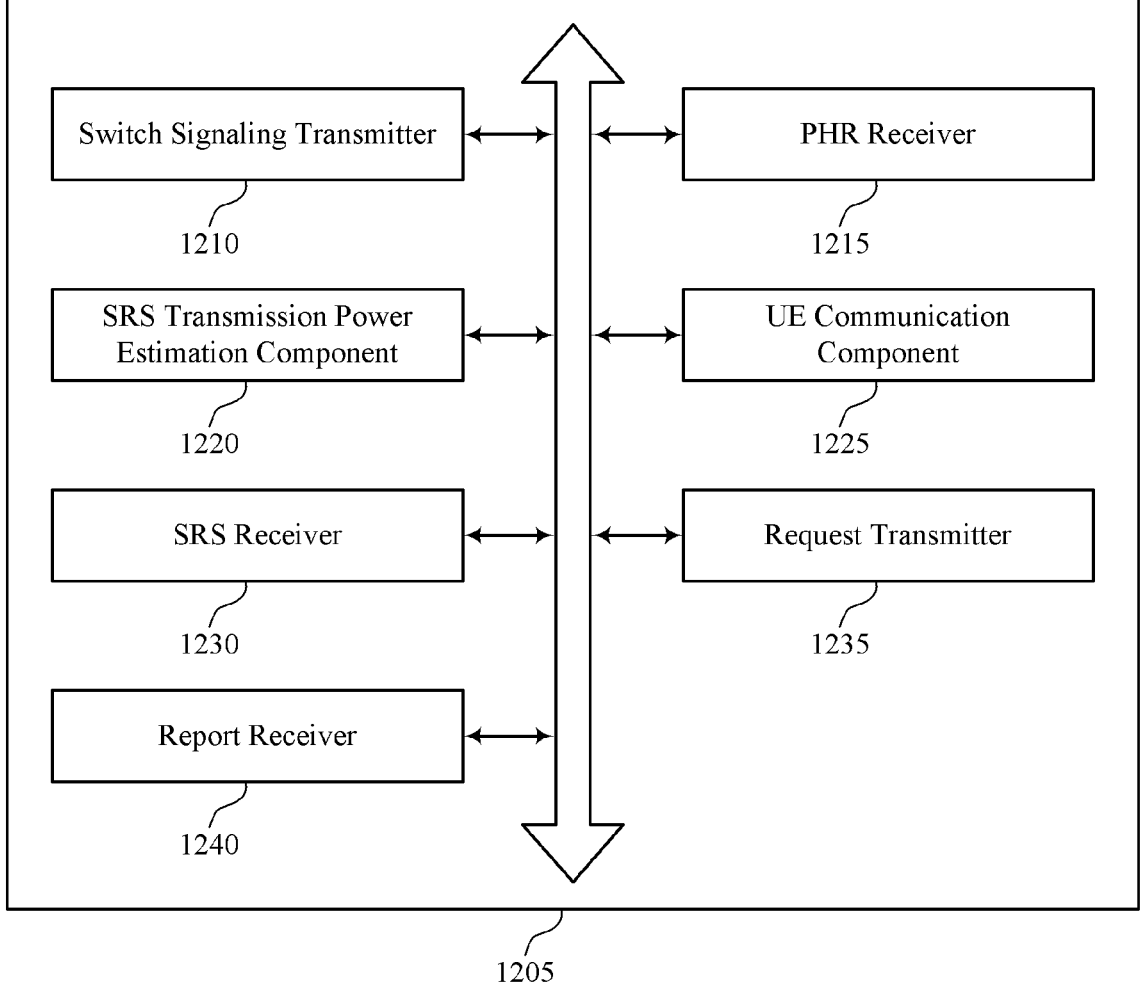
FIG. 12 shows a block diagram of a communication manager that supports SRS power control methods for channel estimation of reconfigurable intelligent surface link in accordance with aspects of the present disclosure.

FIG. 12 shows a block diagram 1200 of a communication manager 1205 that supports SRS power control methods for channel estimation of reconfigurable intelligent surface link in accordance with aspects of the present disclosure. The communication manager 1205 may be an example of aspects of a communication manager 1015, a communication manager 1115, or a communication manager 1310 described herein. The communication manager 1205 may include a switch signaling transmitter 1210, a PHR receiver 1215, a SRS transmission power estimation component 1220, an UE communication component 1225, a SRS receiver 1230, a request transmitter 1235, and a report receiver 1240. Each of these modules may communicate, directly or indirectly, with one another (e.g., via one or more buses).

The switch signaling transmitter 1210 may transmit, to a UE, signaling indicating a switch from a first power control mode to a second power control mode for sounding reference signal transmissions. In some examples, the switch signaling transmitter 1210 may transmit the signaling indicating the switch to the UE via reflection or refraction by a configurable reflective surface. In some cases, the first power control mode includes one of an open-loop power control mode or a closed-loop power control mode and the second power control mode includes the other of the open-loop power control mode and the closed-loop power control mode. In some cases, the signaling includes downlink control information indicating the switch, a medium access control (MAC) control element indicating the switch, or radio resource control signaling indicating the switch.

The PHR receiver 1215 may receive, from the UE and in the second power control mode, a report indicating a power headroom associated with the sounding reference signal transmissions based on transmitting the signaling indicating the switch. In some examples, the PHR receiver 1215 may receive the report indicating the power headroom from the UE via a configurable reflective surface.

The SRS transmission power estimation component 1220 may estimate a sounding reference signal transmission power based on receiving the report indicating the power headroom. In some examples, the SRS transmission power estimation component 1220 may determine a value of a first channel condition parameter associated with the UE based on the estimated sounding reference signal transmission power associated with the report indicating the power headroom and a value of a second channel condition parameter associated with a second UE, where communicating with the UE over the wireless channel is based on determining the value of the first channel condition parameter. In some examples, the report indicating the power headroom may be received via a configurable reflective surface. In some such examples, the SRS transmission power estimation component 1220 may determine a value of a scalar factor associated with a channel condition between the UE and the configurable reflective surface based on the estimated sounding reference signal transmission power associated with the report indicating the power headroom, where determining the value of the first channel condition parameter includes combining the value of the scalar factor and the value of the second channel condition parameter. In some examples, the first channel condition parameter and the second channel condition parameter may be associated with a same channel condition between the configurable reflective surface and the base station.

In some examples, the SRS transmission power estimation component 1220 may determine a value of a first channel condition parameter associated with the UE based on the received report and a value of a second channel condition parameter associated with a second UE, where communicating with the UE over the wireless channel is based on determining the value of the first channel condition parameter. In some examples, the sounding reference signal from the UE may be received via configurable reflective surface. In some such examples, the SRS transmission power estimation component 1220 may determine a value of a scalar factor associated with a channel condition between the UE and the configurable reflective surface based on the received report, where determining the value of the first channel condition parameter includes combining the value of the scalar factor and the value of the second channel condition parameter. In some examples, the first channel condition parameter and the second channel condition parameter may be each associated with a same channel condition between the configurable reflective surface and the base station.

The UE communication component 1225 may communicate with the UE over a wireless channel based on the estimated sounding reference signal transmission power. In some examples, the UE communication component 1225 may communicate with the UE over a wireless channel based on the one or more reports and the sounding reference signal.

The SRS receiver 1230 may receive the sounding reference signal from the UE while operating in the closed-loop power control mode. In some examples, the SRS receiver 1230 may receive, from the UE and in the second power control mode, a sounding reference signal associated with the report indicating the power headroom, where determining the value of the scalar factor is based on receiving the sounding reference signal. In some examples, the SRS receiver 1230 may receive the sounding reference signal from the UE via a configurable reflective surface. In some examples, the sounding reference signal may be received after the one or more reports are received.

The request transmitter 1235 may transmit, to a UE, a request for one or more reports that indicate a transmission power at which the UE transmits a sounding reference signal. In some examples, the request transmitter 1235 may transmit the request to the UE via a configurable reflective surface. In some examples, downlink control information includes the request, a medium access control (MAC) control element includes the request, or radio resource control signaling includes the request.

The report receiver 1240 may receive the one or more reports from the UE based on transmitting the request for the one or more reports. In some examples, the report receiver 1240 may receive the one or more reports from the base station via a configurable reflective surface. In some examples, the report receiver 1240 may receive, from the UE, uplink control information that includes the one or more reports. In some examples, the uplink control information may be received periodically via an uplink control channel transmission, received via an uplink shared channel transmission, or both. In some examples, the one or more reports include a set of reports, where one or more bits from each of the set of reports cumulatively indicate the transmission power. The set of reports may include a first report and a second report, where the one or more bits of the first report include a set of most significant bits corresponding to the transmission power and the one or more bits of the second report include a set of least significant bits corresponding to the transmission power. Each report of the set of reports may be transmitted within a different uplink slot.

Figure 13:
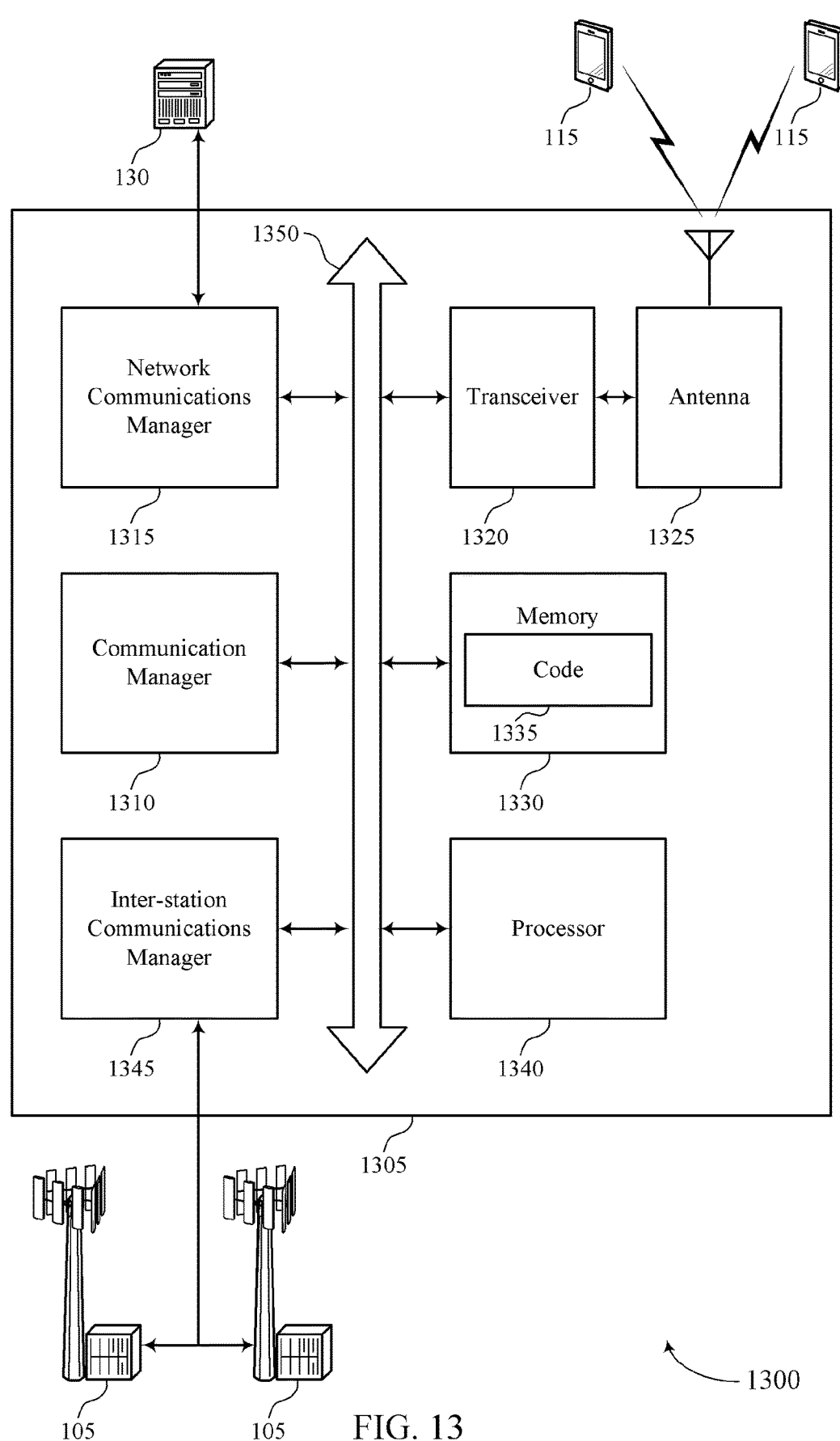
FIG. 13 shows a diagram of a system including a device that supports SRS power control methods for channel estimation of reconfigurable intelligent surface link in accordance with aspects of the present disclosure.

FIG. 13 shows a diagram of a system 1300 including a device 1305 that supports SRS power control methods for channel estimation of reconfigurable intelligent surface link in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communication manager 1310 may transmit, to a UE, signaling indicating a switch from a first power control mode to a second power control mode for sounding reference signal transmissions, receive, from the UE and in the second power control mode, a report indicating a power headroom associated with the sounding reference signal transmissions based on transmitting the signaling indicating the switch, estimate a sounding reference signal transmission power based on receiving the report indicating the power headroom, and communicate with the UE over a wireless channel based on the estimated sounding reference signal transmission power. The communication manager 1310 may also transmit, to a UE, a request for one or more reports that indicate a transmission power at which the UE transmits a sounding reference signal; receive the one or more reports from the UE based on transmitting the request for the one or more reports; receive the sounding reference signal from the UE; and communicate with the UE over a wireless channel based on the one or more reports and the sounding reference signal.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting SRS power control methods for channel estimation of reconfigurable intelligent surface link).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

FIG. 14 shows a flowchart illustrating a method 1400 that supports SRS power control methods for channel estimation of reconfigurable intelligent surface link in accordance with aspects of the present disclosure. The operations of method 1400 may be implemented by a UE 115 or its components as described herein. For example, the operations of method 1400 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1405, the UE may receive, from a base station, signaling indicating a switch from a first power control mode to a second power control mode for sounding reference signal transmissions. The operations of 1405 may be performed according to the methods described herein. In some examples, aspects of the operations of 1405 may be performed by a switch signaling receiver as described with reference to FIGS. 6 through 9.

At 1410, the UE may transmit, to the base station and in the second power control mode, a report indicating a power headroom associated with the sounding reference signal transmissions based on receiving the signaling indicating the switch. The operations of 1410 may be performed according to the methods described herein. In some examples, aspects of the operations of 1410 may be performed by a PHR transmitter as described with reference to FIGS. 6 through 9.

At 1415, the UE may communicate with the base station over a wireless channel based on transmitting the report indicating the power headroom. The operations of 1415 may be performed according to the methods described herein. In some examples, aspects of the operations of 1415 may be performed by a base station communication component as described with reference to FIGS. 6 through 9.

FIG. 15 shows a flowchart illustrating a method 1500 that supports SRS power control methods for channel estimation of reconfigurable intelligent surface link in accordance with aspects of the present disclosure. The operations of method 1500 may be implemented by a UE 115 or its components as described herein. For example, the operations of method 1500 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1505, the UE may receive, from a base station, signaling indicating a switch from a first power control mode to a second power control mode for sounding reference signal transmissions. The operations of 1505 may be performed according to the methods described herein. In some examples, aspects of the operations of 1505 may be performed by a switch signaling receiver as described with reference to FIGS. 6 through 9.

At 1510, the UE may transmit, to the base station and in the second power control mode, a report indicating a power headroom associated with the sounding reference signal transmissions based on receiving the signaling indicating the switch. The operations of 1510 may be performed according to the methods described herein. In some examples, aspects of the operations of 1510 may be performed by a PHR transmitter as described with reference to FIGS. 6 through 9.

At 1515, the UE may transmit, to the base station and in the second power control mode, a sounding reference signal associated with the report indicating the power headroom. The operations of 1515 may be performed according to the methods described herein. In some examples, aspects of the operations of 1515 may be performed by a SRS transmitter as described with reference to FIGS. 6 through 9.

At 1520, the UE may communicate with the base station over a wireless channel based on transmitting the report indicating the power headroom and transmitting the sounding reference signal. The operations of 1520 may be performed according to the methods described herein. In some examples, aspects of the operations of 1520 may be performed by a base station communication component as described with reference to FIGS. 6 through 9.

FIG. 16 shows a flowchart illustrating a method 1600 that supports SRS power control methods for channel estimation of reconfigurable intelligent surface link in accordance with aspects of the present disclosure. The operations of method 1600 may be implemented by a base station 105 or its components as described herein. For example, the operations of method 1600 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1605, the base station may transmit, to a UE, signaling indicating a switch from a first power control mode to a second power control mode for sounding reference signal transmissions. The operations of 1605 may be performed according to the methods described herein. In some examples, aspects of the operations of 1605 may be performed by a switch signaling transmitter as described with reference to FIGS. 10 through 13.

At 1610, the base station may receive, from the UE and in the second power control mode, a report indicating a power headroom associated with the sounding reference signal transmissions based on transmitting the signaling indicating the switch. The operations of 1610 may be performed according to the methods described herein. In some examples, aspects of the operations of 1610 may be performed by a PHR receiver as described with reference to FIGS. 10 through 13.

At 1615, the base station may estimate a sounding reference signal transmission power based on receiving the report indicating the power headroom. The operations of 1615 may be performed according to the methods described herein. In some examples, aspects of the operations of 1615 may be performed by a SRS transmission power estimation component as described with reference to FIGS. 10 through 13.

At 1620, the base station may communicate with the UE over a wireless channel based on the estimated sounding reference signal transmission power. The operations of 1620 may be performed according to the methods described herein. In some examples, aspects of the operations of 1620 may be performed by an UE communication component as described with reference to FIGS. 10 through 13.

FIG. 17 shows a flowchart illustrating a method 1700 that supports SRS power control methods for channel estimation of reconfigurable intelligent surface link in accordance with aspects of the present disclosure. The operations of method 1700 may be implemented by a UE 115 or its components as described herein. For example, the operations of method 1700 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1705, the UE may receive, from a base station, a request for one or more reports that indicate a transmission power at which the UE transmits a sounding reference signal. The operations of 1705 may be performed according to the methods described herein. In some examples, aspects of the operations of 1705 may be performed by a request receiver as described with reference to FIGS. 6 through 9.

At 1710, the UE may transmit the one or more reports to the base station based on receiving the request for the one or more reports. The operations of 1710 may be performed according to the methods described herein. In some examples, aspects of the operations of 1710 may be performed by a report transmitter as described with reference to FIGS. 6 through 9.

At 1715, the UE may transmit the sounding reference signal to the base station. The operations of 1715 may be performed according to the methods described herein. In some examples, aspects of the operations of 1715 may be performed by a SRS transmitter as described with reference to FIGS. 6 through 9.

At 1720, the UE may communicate with the base station over a wireless channel based on the one or more reports and the sounding reference signal. The operations of 1720 may be performed according to the methods described herein. In some examples, aspects of the operations of 1720 may be performed by a base station communication component as described with reference to FIGS. 6 through 9.

FIG. 18 shows a flowchart illustrating a method 1800 that supports SRS power control methods for channel estimation of reconfigurable intelligent surface link in accordance with aspects of the present disclosure. The operations of method 1800 may be implemented by a base station 105 or its components as described herein. For example, the operations of method 1800 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1805, the base station may transmit, to a UE, a request for one or more reports that indicate a transmission power at which the UE transmits a sounding reference signal. The operations of 1805 may be performed according to the methods described herein. In some examples, aspects of the operations of 1805 may be performed by a request transmitter as described with reference to FIGS. 10 through 13.

At 1810, the base station may receive the one or more reports from the UE based on transmitting the request for the one or more reports. The operations of 1810 may be performed according to the methods described herein. In some examples, aspects of the operations of 1810 may be performed by a report receiver as described with reference to FIGS. 10 through 13.

At 1815, the base station may receive the sounding reference signal from the UE. The operations of 1815 may be performed according to the methods described herein. In some examples, aspects of the operations of 1815 may be performed by a SRS receiver as described with reference to FIGS. 10 through 13.

At 1820, the base station may communicate with the UE over a wireless channel based on the one or more reports and the sounding reference signal. The operations of 1820 may be performed according to the methods described herein. In some examples, aspects of the operations of 1820 may be performed by an UE communication component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station via a configurable reflective surface, signaling indicating a switch from a first power control mode to a second power control mode for sounding reference signal transmissions;
   transmitting, to the base station and in the second power control mode, a report indicating a power headroom associated with the sounding reference signal transmissions based at least in part on receiving the signaling indicating the switch; and
   communicating with the base station over a wireless channel based at least in part on transmitting the report indicating the power headroom;
   wherein communication with the base station over the wireless channel includes communicating via a configurable reflective surface that is configured to deflect communications from the UE and the base station.

2. The method of claim 1, wherein the first power control mode comprises one of an open-loop power control mode or a closed-loop power control mode and the second power control mode comprises the other of the open-loop power control mode and the closed-loop power control mode.

3. The method of claim 1, further comprising:
   transmitting, to the base station and in the second power control mode, a sounding reference signal associated with the report indicating the power headroom, wherein communicating with the base station is based at least in part on transmitting the sounding reference signal.

4. The method of claim 1, wherein transmitting the report to the base station comprises:

transmitting the report to the base station via the configurable reflective surface.

5. The method of claim 1, wherein the signaling comprises downlink control information indicating the switch, a medium access control (MAC) control element indicating the switch, or radio resource control signaling indicating the switch.

6. A method for wireless communication at a base station, comprising:

transmitting, to a user equipment (UE) via a configurable reflective surface, signaling indicating a switch from a first power control mode to a second power control mode for sounding reference signal transmissions;

receiving, from the UE and in the second power control mode, a report indicating a power headroom associated with the sounding reference signal transmissions based at least in part on transmitting the signaling indicating the switch;

estimating a sounding reference signal transmission power based at least in part on receiving the report indicating the power headroom; and communicating with the UE over a wireless channel based at least in part on the estimated sounding reference signal transmission power;

wherein communication with the UE over the wireless channel includes communicating via a configurable reflective surface that is configured to deflect communications from the UE and the base station.

7. The method of claim 6, wherein the first power control mode comprises one of an open-loop power control mode or a closed-loop power control mode and the second power control mode comprises the other of the open-loop power control mode and the closed-loop power control mode.

8. The method of claim 6, further comprising:

determining a value of a first channel condition parameter associated with the UE based at least in part on the estimated sounding reference signal transmission power associated with the report indicating the power headroom and a value of a second channel condition parameter associated with a second UE, wherein communicating with the UE over the wireless channel is based at least in part on determining the value of the first channel condition parameter.

9. The method of claim 8, wherein receiving the report indicating the power headroom from the UE comprises receiving the report from the UE via a configurable reflective surface, the method further comprising:

determining a value of a scalar factor associated with a channel condition between the UE and the configurable reflective surface based at least in part on the estimated sounding reference signal transmission power associated with the report indicating the power headroom, wherein determining the value of the first channel condition parameter comprises combining the value of the scalar factor and the value of the second channel condition parameter.

10. The method of claim 9, further comprising:

receiving, from the UE and in the second power control mode, a sounding reference signal associated with the report indicating the power headroom, wherein determining the value of the scalar factor is based at least in part on receiving the sounding reference signal.

11. The method of claim 9, wherein the first channel condition parameter and the second channel condition parameter are each associated with a same channel condition between the configurable reflective surface and the base station.

12. The method of claim 6, wherein receiving the report indicating the power headroom from the UE comprises:

receiving the report indicating the power headroom from the UE via the configurable reflective surface.

13. The method of claim 6, wherein the signaling comprises downlink control information indicating the switch, a medium access control (MAC) control element indicating the switch, or radio resource control signaling indicating the switch.

14. A method for wireless communication at a user equipment (UE), comprising:

receiving, from a base station via a configurable reflective surface, a request for one or more reports that indicate a transmission power at which the UE transmits a sounding reference signal;

transmitting the one or more reports to the base station based at least in part on receiving the request for the one or more reports;

transmitting the sounding reference signal to the base station; and communicating with the base station over a wireless channel based at least in part on the one or more reports and the sounding reference signal;

wherein communication with the base station over the wireless channel includes communicating via a configurable reflective surface that is configured to deflect communications from the UE and the base station.

15. The method of claim 14, wherein transmitting the sounding reference signal to the base station comprises:

transmitting the sounding reference signal to the base station via the configurable reflective surface.

16. The method of claim 14, wherein transmitting the one or more reports to the base station comprises:

transmitting the one or more reports to the base station via the configurable reflective surface.

17. The method of claim 14, wherein:

downlink control information comprises the request, a medium access control (MAC) control element comprises the request, or radio resource control signaling comprises the request.

18. The method of claim 14, wherein transmitting the one or more reports to the base station comprises:

transmitting, to the base station, uplink control information that comprises the one or more reports.

19. The method of claim 18, wherein the uplink control information is transmitted periodically via an uplink control channel transmission, transmitted via an uplink shared channel transmission, or both.

20. The method of claim 14, wherein the one or more reports comprise a plurality of reports, wherein one or more bits from each of the plurality of reports cumulatively indicate the transmission power.

21. The method of claim 20, wherein the plurality of reports comprise a first report and a second report, wherein the one or more bits of the first report comprise a set of most significant bits corresponding to the transmission power and the one or more bits of the second report comprise a set of least significant bits corresponding to the transmission power.

22. The method of claim 20, wherein each report of the plurality of reports is transmitted within a different uplink slot.

23. The method of claim 14, wherein the sounding reference signal is transmitted after the one or more reports are transmitted.

24. A method for wireless communication at a base station, comprising:

transmitting, to a user equipment (UE) via a configurable reflective surface, a request for one or more reports that indicate a transmission power at which the UE transmits a sounding reference signal;

receiving the one or more reports from the UE based at least in part on transmitting the request for the one or more reports;

receiving the sounding reference signal; and communicating with the UE over a wireless channel based at least in part on the one or more reports and the sounding reference signal;

wherein communication with the UE over the wireless channel includes communicating via a configurable reflective surface that is configured to deflect communications from the UE and the base station.

25. The method of claim 24, further comprising:

determining a value of a first channel condition parameter associated with the UE based at least in part on the one or more reports and a value of a second channel condition parameter associated with a second UE, wherein communicating with the UE over the wireless channel is based at least in part on determining the value of the first channel condition parameter.

26. The method of claim 25, wherein receiving the sounding reference signal from the UE comprises receiving the sounding reference signal via a configurable reflective surface, the method further comprising:

determining a value of a scalar factor associated with a channel condition between the UE and the configurable reflective surface based at least in part on the one or more reports, wherein determining the value of the first channel condition parameter comprises combining the value of the scalar factor and the value of the second channel condition parameter.

27. The method of claim 24, wherein receiving the sounding reference signal from the UE comprises:

receiving the sounding reference signal from the UE via the configurable reflective surface.

28. The method of claim 24, wherein receiving the one or more reports from the base station comprises:

receiving the one or more reports from the base station via the configurable reflective surface.

29. The method of claim 24, wherein:

downlink control information comprises the request, a medium access control (MAC) control element comprises the request, or radio resource control signaling comprises the request.

30. The method of claim 24, wherein receiving the one or more reports from the UE comprises:

receiving, from the UE, uplink control information that comprises the one or more reports.

31. An apparatus for wireless communication at a user equipment (UE), comprising:

a processor, memory in electronic communication with the processor, and instructions stored in the memory and executable by the processor to cause the apparatus to:

receive, from a base station via a configurable reflective surface, signaling indicating a switch from a first power control mode to a second power control mode for sounding reference signal transmissions;

transmit, to the base station and in the second power control mode, a report indicating a power headroom associated with the sounding reference signal transmissions based at least in part on receiving the signaling indicating the switch; and communicate with the base station over a wireless channel based at least in part on transmitting the report indicating the power headroom;

wherein communication with the base station over the wireless channel includes communicating via a configurable reflective surface that is configured to deflect communications from the UE and the base station.

\* \* \* \* \*